(12) United States Patent
Carlsen et al.

(10) Patent No.: US 11,590,543 B2
(45) Date of Patent: Feb. 28, 2023

(54) PIPELINE MAINTENANCE AND INSPECTION VEHICLE

(71) Applicant: Kongsberg Ferrotech AS, Kongsberg (NO)

(72) Inventors: Christopher Carlsen, Kongsberg (NO); Bert Pasop, Raudsand (NO); Alexandr Tcacenco, Kongsberg (NO); Mario Zuvela, Drammen (NO); Torgeir Bræin, Kongsberg (NO); Luis Fidel De La Torre Ugarte Del Castillo, Kongsberg (NO); Jens Harald Seiertun, Trondheim (NO); Wan Muhammad Faiz Wan Rustam, Semenyih (MY)

(73) Assignees: Kongsberg Ferrotech AS, Kongsberg (NO); Petroliam Nasional Berhad (Petronas), Kuala Lumpur (MY)

( * ) Notice: Subject to any disclaimer, the term of this patent is extended or adjusted under 35 U.S.C. 154(b) by 1074 days.

(21) Appl. No.: 16/318,495

(22) PCT Filed: Jul. 18, 2017

(86) PCT No.: PCT/NO2017/050195
§ 371 (c)(1),
(2) Date: Jan. 17, 2019

(87) PCT Pub. No.: WO2018/016969
PCT Pub. Date: Jan. 25, 2018

(65) Prior Publication Data
US 2019/0314873 A1  Oct. 17, 2019

(30) Foreign Application Priority Data

Jul. 19, 2016  (GB) .................................... 1612517

(51) Int. Cl.
| | | |
|---|---|---|
| *B08B 9/023* | (2006.01) | |
| *B63G 8/00* | (2006.01) | |
| *F16L 1/26* | (2006.01) | |

(52) U.S. Cl.
CPC .............. *B08B 9/023* (2013.01); *B63G 8/001* (2013.01); *F16L 1/26* (2013.01); *B63G 2008/005* (2013.01)

(58) Field of Classification Search
CPC .... B08B 3/00; B08B 3/02; B08B 9/00; B08B 9/023; B63G 8/00; B63G 8/001;
(Continued)

(56) References Cited

U.S. PATENT DOCUMENTS

| | | |
|---|---|---|
| 4,205,694 A | 6/1980 | Thompson et al. |
| 5,213,172 A | 5/1993 | Paris |

(Continued)

FOREIGN PATENT DOCUMENTS

| | | |
|---|---|---|
| CN | 101480972 A | 7/2009 |
| CN | 101664927 A | 3/2010 |

(Continued)

OTHER PUBLICATIONS

International Search Report and Written Opinion dated Sep. 22, 2017, for corresponding International Application No. PCT/NO2017/050195; International Filing Date: Jul. 18, 2017 consisting of 11-pages.

(Continued)

*Primary Examiner* — Lars A Olson
(74) *Attorney, Agent, or Firm* — Christopher & Weisberg, P.A.

(57) ABSTRACT

A vehicle (10) for performing operations on a subsea pipeline, such as a riser (2), carries one or more interchangeable modules (18) and is configured to translate along the riser (2). The vehicle (10) comprises an elongate support structure (Continued)

(12) for carrying the modules (18). Gripper arms (14, 16) hold the support structure (12) a predetermined distance away from the elongate body and cause translation of the vehicle (10) along the riser (2) using a hand-over-hand action, so as to allow the vehicle (10) to pass protuberances or obstacles, such as a clamp (8), on the riser (2).

20 Claims, 15 Drawing Sheets

(58) Field of Classification Search
CPC .. B63G 2008/005; B63B 35/00; B63H 19/00; F16L 1/00; F16L 1/26
USPC .......................................................... 180/8.1
See application file for complete search history.

(56) References Cited

U.S. PATENT DOCUMENTS

| | | |
|---|---|---|
| 2010/0235018 A1 | 9/2010 | Christ |
| 2013/0025947 A1 | 1/2013 | Nance et al. |
| 2014/0156067 A1 | 6/2014 | An et al. |
| 2014/0338472 A1 | 11/2014 | Chang |
| 2016/0059939 A1 | 3/2016 | Lamonby et al. |

FOREIGN PATENT DOCUMENTS

| | | |
|---|---|---|
| CN | 101734300 A | 6/2010 |
| CN | 102490804 A | 6/2012 |
| CN | 102632505 A | 8/2012 |
| CN | 103042010 A | 4/2013 |
| CN | 103395064 A | 11/2013 |
| CN | 103640010 A | 3/2014 |
| CN | 203635567 U | 6/2014 |
| CN | 104129447 A | 11/2014 |
| CN | 204355189 U | 5/2015 |
| CN | 204472948 U | 7/2015 |
| CN | 104972460 A | 10/2015 |
| JP | S63219490 A | 9/1988 |
| KR | 20120058872 A | 6/2012 |
| KR | 20130026154 A | 3/2013 |
| WO | 2012013847 A1 | 2/2012 |
| WO | 2016144627 A1 | 9/2016 |

OTHER PUBLICATIONS

IPO Search Report dated Jan. 12, 2017, for corresponding Application No. GB1612517.1; Filing Date: Jul. 19, 2016 consisting of 3-pages.

PIPELINE MAINTENANCE AND INSPECTION VEHICLE

CROSS-REFERENCE TO RELATED APPLICATIONS

This application is a Submission under 35 U.S.C. § 371 for U.S. National Stage Patent Application of, and claims priority to, International Application Number PCT/NO2017/050195 entitled PIPELINE MAINTENANCE AND INSPECTION VEHICLE, filed Jul. 18, 2017, which is related to and claims priority to Great Britain Patent Number 1612517.1, filed Jul. 19, 2016, the entirety of all of which are incorporated herein by reference.

The present invention relates to a vehicle for performing work on an elongate structure, and particularly to a vehicle that travels along a pipeline for performing inspection, maintenance and repair operations.

Inspection, maintenance and repair of subsea pipelines and risers is sometimes carried out using a remotely operated underwater vehicle (ROUV). An ROUV is an underwater mobile device, operated by a crew aboard a vessel. Most ROUVs are equipped with at least a video camera and lights, but additional equipment is commonly added to expand the vehicle's capabilities, such as a manipulator or cutting arm, and various measurement instruments.

ROUVs are useful for certain applications, such as point inspection and maintenance. However, ROUVs are difficult to control precisely as they can move freely in all dimensions meaning that, whilst they can easily access a remote location along a pipeline, they are not well suited to inspecting or maintaining a pipeline along its entire length. ROUVs are also unable to perform operations in areas with wave or current interactions, such as in the splash zone (the area immediately above and below the water level).

A class of devices known as generally "crawlers" has been developed, which are better suited for this purpose. A crawler surrounds the pipeline and uses rollers, tracks or grippers to crawl along the pipeline, performing inspection or maintenance as it travels. Such devices are easily controlled and allow precise positioning of instruments with respect to the pipeline. However, they are often only suitable for smooth, unobstructed pipelines without protuberances. Such devices typically embrace the tubular, and become excessively heavy with large diameters.

One crawler device designed for performing inspection and repair of a pipeline is disclosed in WO2012/013847 (also published in English as EP2600051A4). The device uses guide rings to align itself on the pipeline as it is moved along and is capable of passing uneven portions of the pipeline by expanding the rings. However, the device still completely encircles the pipeline and so encounters difficulties when used for pipelines with connection to other structures A further crawler device, which is designed for pipeline cleaning and inspection, is disclosed in US 2016/0059939. This device operates in two modes. In the first mode, it uses wheels to move along the pipeline as a conventional crawler device. In a second mode of operation, it uses two circular grippers connected by a hydraulic linear actuator to move along the pipeline. Particularly, the rear gripper grips the pipeline, the actuator extends causing the front gripper to move along the pipeline, the front gripper engages and the rear gripper releases, and the actuator contracts causing the rear gripper to move along the pipeline. The device includes a narrow opening along its length to allow it to pass mooring ropes.

Whilst this device is better able to travel along certain pipelines, it still substantially encircles the pipeline and so would encounter difficulty for more complex pipelines having larger protuberances.

Viewed from a first aspect, the present invention provides a vehicle for carrying one or more modules along an elongate body, the vehicle comprising: an elongate support structure for carrying the one or more modules, wherein the vehicle is configured to hold the support structure a distance away from the elongate body; and a translation mechanism connected to the support structure for causing the vehicle to translate along the elongate body.

The vehicle described above has an arrangement whereby the modules are supported by a support structure, which is in turn held away from the elongate body. Thus, the elongate support structure is relatively narrow compared to the prior art crawlers which substantially surround the elongate body, and so can easily pass even large protuberances along the elongate body.

The elongate body is preferably a tubular body, and preferably a subsea pipeline such as a riser. Other elongate bodies may include, for example, platform legs, topside pipes, scaffolding, and the like. The elongate body preferably has at least one protuberance along its length. Exemplary protuberances may include structures on the elongate body, such as one or more of a clamp, a valve and a mooring line. The protuberances may also include accumulated matter on the surface of the body, such as rust, organic matter or the like.

The vehicle is preferably configured to pass a protuberance on the elongate body. The term obstacle is also sometimes used to refer to such a protuberance. Preferably the vehicle is configured such that every part of the vehicle is capable of passing a protuberance having a total width of at least twice the width of the elongate body, such as a clamp or valve.

Preferably the vehicle is also or alternatively configured such that every part of the vehicle is capable of passing a protuberance extending indefinitely away from the elongate body, such as a mooring line. In one embodiment, every part of the vehicle is capable of achieving a clearance angle of at least 90° with respect to the axis of the elongate body to pass the protuberance, i.e. there is an angular sector into which the part does not intrude. Preferably every part of the vehicle is capable of achieving a clearance angle of at least 135°, and most preferably at least 180°. In some embodiments, even greater angle may be achieved, for example up to 270°. Such a configuration allows the vehicle to translate along complex structures, for example where the elongate body is supported by two or more members, such as in an apex frame or the like.

It will be appreciated that the elongate support structure preferably does not completely surround the elongate body. In preferred embodiments, the elongate support structure preferably does not surround more than 180° of the elongate body, preferably less than 90° and preferably less than 45°. That is to say, from the axis of the elongate body, the elongate support structure fits within an angle of view of 180°, preferably within 90° and more preferably within 45°.

The vehicle is preferably configured to hold the elongate support structure such that it is substantially aligned with the elongate body. Where both the elongate body and elongate support structure are straight, the vehicle is preferably configured to hold the elongate support structure such that it is substantially parallel with the elongate body, e.g. within 10°.

The elongate support structure preferably has a constant length. That is to say, the support structure does not extend and contract its overall length. Instead, one or more parts of the vehicle may move with respect to the support structure, e.g. by sliding up and down its length. In some embodiments, the elongate support body may be a rigid member. In other embodiments, the elongate support structure may comprise an articulated member, having two or more hinged sections. In that case, each section preferably has a constant length.

The vehicle may comprise one or more guide assemblies for aligning the vehicle, and preferably the support structure in particular, with respect to the elongate body. The guide assemblies preferably restrict at least one degree of movement with respect to the elongate body, and preferably restrict all degrees of movement except for axial movement along the elongate body and/or rotation about the axis of the elongate body.

The guide assemblies are preferably connected to the support structure. The guide assemblies may be configured to hold the weight of the support structure. However, in preferred embodiments the guide assemblies provide only an aligning function and do not support the majority of the weight of the vehicle.

Each guide assembly is preferably configured to pass a protuberance on the elongate body. For example, each guide assembly may be configured to be movable away from the elongate body, either passively or in a controlled manner.

Each guide assembly preferably comprises at least two engagement members for engaging the elongate body from different directions. For example, the guide assembly may comprise a yoke supporting the engagement members on opposing sides of the elongate body. The engagement members preferably comprise rollers, although other forms of engagement member could be used. Preferably the engagement members are connected to the support structure so as to allow them to disengage from the elongate body. For example, the engagement members may be mounted on arms rotatable about an axis offset from the axis of the elongate body. The axis may be substantially parallel to the axis of the elongate body or it may be substantially parallel to a direction perpendicular to the axis of the elongate body.

The translation mechanism preferably comprises at least two translation members, such as grippers, belts, wheels, tracks or the like. Preferably each of the translation members is configured to be disengagable from the elongate body to pass a protuberance. Preferably the translation mechanism can support the weight of the vehicle under designed operating conditions, and preferably also in atmospheric conditions, when at least one of the translation members is disengaged from the elongate body.

Preferably the translation mechanism is configured such that the vehicle can translate with at least one translation member engaged with the elongate body at all times. Preferably the translation mechanism is configured such that, in the event of loss of power, at least one translation member remains engaged with the elongate body.

Preferably the translation mechanism is configured to hold the support structure at either fixed distance away from the elongate body or at a controllable distance away from the elongate body. For example, each translation member may be supported by an arm connected to the support structure.

The vehicle may use any of a number of different translation mechanisms. For example, the translation members may comprise wheels or rollers driven by a motor. Alternatively, the vehicle may use thrusters, propellers or the like. Preferably, however, each translation member comprises a gripper configured to grip the elongate body. Grippers have been found to provide the most reliable and precise means of translation along an elongate body. Of particular importance is that a gripper does not normally allow any axial movement when gripped, ensuring that the vehicle does not move in the event of loss of power (provided the gripper remains engaged).

Preferably at least one of the grippers is movable relative to the support structure in the axial direction of the elongate body. Thus, the vehicle can translate along the elongate body by gripping the elongate body, moving the movable gripper, reversing which grippers grip the elongate body, and reversing the movement of the movable. As discussed above, the vehicle is preferably configured such that there is always at least one gripper engaged with the elongate body at any time. The grippers are preferably configured to not release the elongate body in the event of loss of power.

In a preferred embodiment, the at least one gripper is movable so as to move past at least one other gripper. This increases the range of movement available for the grippers within a given length of space, allowing the vehicle to move further for each grip-move cycle.

Viewed from one aspect, the method further comprises a method of translating the vehicle along an elongate body, the method comprising repeating the following step: engaging a first gripper to grip the elongate body; releasing a second gripper arm to release the elongate body; moving the second gripper arm, towards or past the first gripper arm in the axial direction of the elongate body; engaging the second gripper to grip the elongate body; releasing the first gripper arm to release the elongate body; and moving the first gripper arm away from or past the second gripper arm.

The translation mechanism preferably comprises two arms with one of the grippers at the end of each arm. Each of the arms can preferably be swung aside from the elongate body to allow the vehicle to pass a protuberance. Preferably each arm can be swung to an angle of at least 45° with respect to the axis of the support structure.

The method may thus comprise, after releasing the first or second gripper arm, swinging it aside from the elongate body and, before engaging the first or second gripper arm, swinging it to engage with the elongate body.

In one embodiment, each gripper comprises first and second clamps arranged to oppose each other, wherein the clamps define a path for the elongate body to be received therebetween. The gripper preferably further comprises an actuation mechanism configured to drive the first and second clamps to move towards the path. In one arrangement, two frame members connect to the first and second clamps, respectively, the frame members being pivotally connected to one another about an axis perpendicular to the path. The actuation mechanism may then be configured to drive a relative rotation between the frame members causing the first and second clamps to move towards the path.

The gripper may further comprise third and fourth clamps arranged to oppose each other and being axially offset along the path from the third and fourth clamps. Of the two frame members, one may connect the first and fourth clamps and the other may connect the second and third clamps. When the actuation mechanism drives relative rotation between the frame members the first and second clamps and the third and fourth clamps are each caused to move towards the path. This gripper configuration provides a stable connection where the elongate body is gripped in a manner that provides resistance of rotation of the gripper, and hence the vehicle, about the axis perpendicular to the elongate body.

It will be appreciated that the gripper may be used for other applications. Accordingly, viewed from another aspect, the present invention provides also a gripper for gripping an elongate body, comprising: first and second clamps arranged to oppose each other, and third and fourth clamps arranged to oppose each other, wherein the clamps define a path for an elongate body to be received therebetween, the first and third clamps being located on one side of the path, the second and fourth clamps being located on the other of the path, and the first and second clamps being axially offset along the path from the third and fourth clamps; two frame members, one connecting the first and fourth clamps and one connecting the second and third clamps, the frame members being pivotally connected to one another about an axis perpendicular to the path; and an actuation mechanism configured to drive a relative rotation between the frame members causing the first and second clamps and the third and fourth clamps to each move towards the path.

The actuation mechanism may be configured to push the second clamp away from the fourth clamp to drive the rotation of the frame members.

The actuation mechanism preferably comprises two linkage members pivotally connected to one another and pivotally connected at their free ends to one of the frame members, respectively. The actuation mechanism preferably drives the relative rotation by driving the pivotally connected ends of the linkage members towards or away from the axis of rotation of the frames. The linkages are preferably driven by a linear actuator.

The linkage members are preferably sized so as to be aligned in a straight line when the gripper is in its engaged position. The linkage members are preferably shaped to permit movement beyond the straight line position into an overextended position, but to prevent further movement beyond the overextended position. In this position, the gripper is slightly released from its maximum grip, but a force pushing the gripper in the release direction pushes the linkages further in the overextended direction, which is prevented by the shape of the linkages. This configuration requires no power to remain engaged, thus providing a failsafe gripper. In the overextended position, the linkage members are preferably less than 20°, and more preferably less than 10°, away from the straight line direction.

In one embodiment, the vehicle may be adaptable for use with multiple elongate bodies of different cross-sectional shape. For example, the clamps of the gripper or the grippers themselves may be configured to be interchangeable.

The grippers may each be part of a gripper system. The system may comprise a mount, an arm connected to the mount via a hinge and the gripper. In one arrangement, each gripper system may comprise a linear actuator oriented in a direction parallel to the hinge axis, and the linear actuator is connected to the linkage via an arm. The gripper system is preferably arranged such that movement of the linear actuator causes the linkage to first release the clamps and then to rotate the arm about the hinge. This occurs because the axis of the actuator is offset from the axis of the hinge. Thus, when the linkage reaches the limit of its travel, the arm is swung aside by the continued movement of the actuator.

The vehicle may comprise two or more such gripper systems, preferably connected to the support structures via their mounts, where at least one of the gripper systems is movable with respect to the support structure.

The vehicle, and preferably the translation mechanism in particular, is preferably configured to drive controlled rotation of the vehicle around the axis of the elongate body.

In one arrangement, each clamp of the gripper preferably includes a housing and a friction pad for engaging the elongate body. The friction pad is preferably movable with respect to the housing to cause the housing to rotate about an axis of the elongate body. Thus, where the housing is connected to the support structure, e.g. via the frame members of the gripper, the relative rotation of the housing and the friction pad will cause the vehicle to rotate about the axis of the elongate body.

The vehicle may be arranged to carry modules for a variety of purposes. Preferably, the one or more modules are configured to perform one or more operations on the riser or on a structure in the vicinity of the riser. Such operations may include one or more of inspection operations, maintenance operations (such as cleaning and/or repair operations), upgrading operations, decommissioning operations, and the like. For example, the one or more modules may include at least one of a repair module, a cleaning module, an inspection module and a manipulator module.

The one or more modules may be permanently connected to the support structure. However, more preferably, at least one of the one or more modules is interchangeable, i.e. such that it can be removed and replaced by another, different module. Thus, the vehicle may comprise one or more module connection points for alternate connection of at least two different modules. This modular configuration allows for a single vehicle to be used for multiple purposes. For example, the vehicle may be used to perform an inspection process followed by a repair process, i.e. by first using an inspection module, removing the inspection module, and replacing the inspection module with a repair module.

In one embodiment, the vehicle may comprise a repair module. The repair module is preferably a re-usable repair module. The repair module may comprise a housing shaped to surround the elongate body, establishing a sealed chamber between the housing and the elongate body. The repair module is preferably capable of draining water from the sealed chamber and/or performing a repair on the elongate body using a self-contained repair apparatus. The repair module may be configured to fill the sealed chamber with a fluid during the repair. The fluid may be air or another gas, pure water, a cleaning fluid or other agent. The vehicle or repair module may include a local source of fluid or may comprise a connection to a remote source, such as via an umbilical.

The housing of the repair module may comprise two housing segments that, when engaged with one another around an elongate body, form the sealed chamber. The housing segments are preferably separated by a rotational movement about a pivot axis.

The repair module is preferably carried by the support structure via a frame, which provides pivots about which the housing segments rotate to engage or disengage the elongate body. The frame is preferably shaped so that the housing segments, when closed, will close around the elongate body when the vehicle engages the elongate body. The repair module is preferably capable of passing a protuberance on the elongate body when the housing segments are in their open position.

At least one of the housing segments preferably includes a seal along its free edge for sealing against the other housing segment. The housing preferably further comprises a sealing arrangement for sealing against the elongate body. The sealing arrangement is preferably provided with a part on each housing segment.

The sealing arrangement may comprise a seal stack shaped to surround the elongate body, the seal stack comprising at least three seal members interleaved with spacers so as to define at least two chambers between adjacent seal members, wherein one of the chambers is connected to a pressurised fluid conduit to provide a fluid barrier, and wherein another of the chambers is connected to a drain conduit.

This seal configuration provides a good configuration for sealing against an elongate body that does not have an even surface, as is likely to be the case where repair is required. Should water leak past one seal, it can be drained via the drain conduit to reduce its pressure. Furthermore, a fluid barrier is provided that opposes ingress of water beyond the fluid barrier.

Preferably a frame is provided around the seal stack and a compression assembly is provided to compress the seal stack against the frame. This configuration applies pressure to the seal stack, causing it to expand radially and engage the elongate body.

The compression assembly may comprise a lever arm connected to the frame and arranged to press on the seal stack. Optionally a compression ring may be provided between the seal stack and the lever arm. A linear actuator may be connected to the other end of the lever arm to cause it to press on the seal stack. This allows for engagement of the seal in a precise and controlled manner.

In an alternate arrangement, the compression assembly may comprise a pair of threaded elements, wherein one threaded element is axially fixed to the frame such that relative rotation of the elements applies compression to the seal stack.

Preferably the fluid barrier chamber is inward with respect to the drain chamber. That is to say, the fluid barrier chamber is closer to the sealed chamber of the repair module. In one embodiment, the fluid barrier chamber is formed adjacent the innermost seal member of the seal stack. In alternative arrangements, however, fluid barrier chamber may be outwards with respect to the drain chamber, i.e. towards the exterior.

The seal assembly is preferably configured to supply fluid to the fluid barrier at a pressure higher than the pressure outside the seal assembly. Thus, the fluid barrier opposes the ingress of water into the sealed chamber. Preferably the fluid forming the fluid barrier is the same as a fluid filling the sealed chamber.

Preferably the seal members are provided in a replaceable cartridge. Optionally, the spacers may also be provided in the replaceable cartridge. Thus, the sealing member can be replaced with different seals, for example to seal against elongate bodies of different shapes or materials, or to improve a seal against a particularly uneven body.

The sealing arrangement should not be seen as being limited to this application. Accordingly, viewed from another aspect, the present invention thus also provides a sealing arrangement for sealing against an uneven outer surface of an elongate body, the sealing arrangement comprising a seal stack shaped to surround the elongate body, the seal stack comprising at least three seal members interleaved with spacers so as to define at least two chambers between adjacent seal members, wherein one of the chambers is connected to a pressurised fluid conduit to provide a fluid barrier, and wherein another of the chambers is connected to a drain conduit. The sealing assembly may include any one or more of the optional features described above.

The present invention also provides, in yet another aspect, a housing for sealing against an uneven outer surface of an elongate body using the seal arrangement described above, wherein the housing is adapted to fill a sealed chamber with a fluid and to supply the same fluid to the fluid barrier in the seal.

The housing may comprise any one or more of the optional features of the repair module described above.

The present invention may also be seen to provide a repair apparatus for repairing an elongate body. The repair apparatus may comprise any one or more of the optional features of the repair module described above. Particularly, the repair apparatus preferably comprises a housing comprise two housing segments that, when engaged with one another around an elongate body, form a sealed chamber. The housing segments are preferably engaged with and/or separated from one another and/or the elongate body by a rotational movement of one or both of the housing segments about a pivot axis. The pivot axis is preferably offset from and substantially parallel to an axis of the elongate body.

Viewed from another aspect, the present invention may also be seen to provide a method of using a repair module or apparatus comprising two housing segments, such as that described above. The method comprises: aligning the two segments with a repair site on an elongate body and rotating one or both of the housing segments about a hinge so as to engage with one another to create a chamber adjacent to the elongate body.

The method may optionally comprise engaging one or more seals to seal the chamber. The one or more seals may comprise a seal assembly for sealing between the housing and the elongate body. The seal assembly include any one or more or all of the features of the sealing assembly described above.

The method may comprise draining a fluid, such as water, from the chamber and/or injecting a (different) fluid, such as air or another gas, into the chamber.

The method may comprise performing a repair operation on the elongate body. The repair operation may be carried out using a reusable repair mechanism. The repair is preferably carried out after the draining and/or injecting.

The method may further comprise, after performing the repair operation, separating the housing segments by rotating one or both of the housing segments about a hinge. The method may further comprise moving the housing segments laterally away from the elongate body, for example so as to disengage the repair module from the elongate body.

In one embodiment, the one or more modules may comprise a manipulator module. The manipulator module preferably comprises a manipulator, such as a gripper or the like. The manipulator may be provided on an articulated arm, for example, such that the vehicle can perform various operations on or around the elongate body.

In one embodiment, the one or more modules may comprise a cleaning module. The cleaning module preferably comprises a cleaning tool for cleaning the elongate body or an object close to the elongate body.

In one embodiment, the cleaning tool comprises one or more brushes, or one or more flexible or elastomeric cleaning elements. Preferably the cleaning elements are arranged as outwardly elements rotatable by a rotor. The cleaning elements are preferably configured so as to repeatedly impact against a surface of the elongate body.

Optionally, either in addition or instead of the cleaning elements, the cleaning tool may comprise one or more fluid nozzles. The cleaning module may be configured to supply fluid from a fluid container, from topside through a tube, or from the surrounding environment, e.g. the fluid may be water. The cleaning module thus preferably comprises a pump for supplying pressurised fluid to the nozzles.

In one embodiment, a single module may be configured to operate as both a manipulator module and as a cleaning module. For example, the manipulator may be configured to carry a cleaning tool.

Viewed from another aspect, the present invention also comprises a method of performing operations on an elongate body using the vehicle described above, comprising: performing a first operation using a first module mounted to the vehicle, removing the first module from the vehicle and mounting a second module to the vehicle, and performing a second operation using the second module mounted to the vehicle.

In a preferred embodiment, the method is a method of inspecting and repairing the elongate body, wherein: the first module is an inspection module and the first operation comprises performing an inspection process on an elongate body; and wherein the second module is a repair module and the second process comprises performing a repair on the elongate body using the repair module.

It will be appreciated that, in accordance with this method, both the inspection and repair process are performed using the same vehicle, but with different modules.

In one embodiment, the inspection comprises identifying a repair site on the elongate body and the repair process comprises translating the vehicle to the repair site. Preferably the steps of removing the first module from the vehicle and/or mounting a second module to the vehicle take place at a location remote from the repair site.

The method may further comprise performing a cleaning operation using a cleaning module mounted to the vehicle. The cleaning process is preferably performed prior to the inspection process. The method preferably therefore further comprises removing the cleaning module from the vehicle and mounting the inspection module to the vehicle. Alternatively, the method may comprise performing the cleaning and inspection processes simultaneously, i.e. with both modules mounted to the vehicle.

Certain preferred embodiments of the invention will now be described in greater detail by way of example only and with reference to the accompanying drawings, in which.

Figure 1:
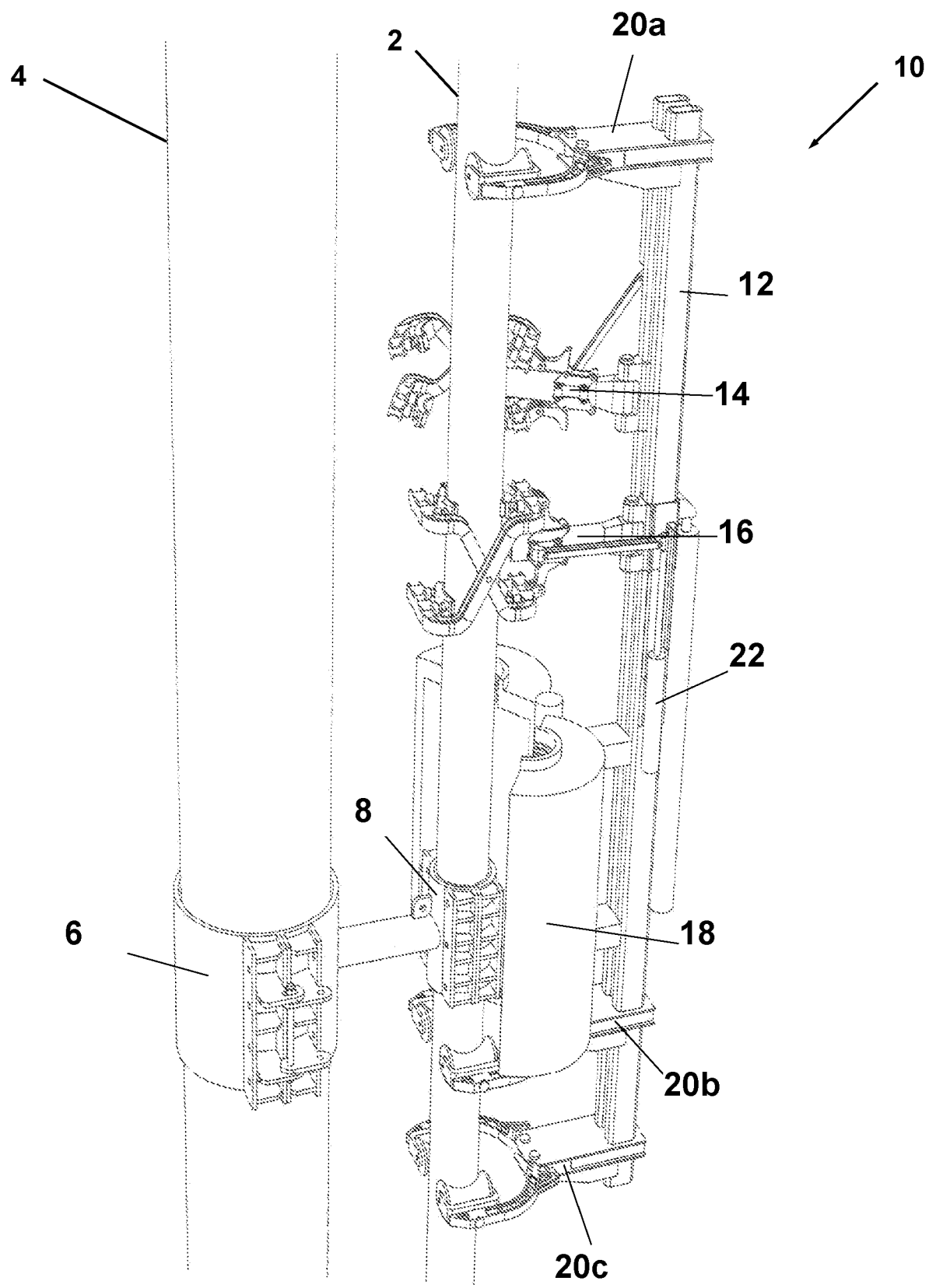
FIG. 1 shows a vehicle capable of translation along a pipeline.

FIG. 1 illustrates a vehicle 10 for carrying one or more modular components to be used during inspection, repair or maintenance of a subsea pipeline, such as a riser 2. As used herein, "inspection" refers to operations which assess the condition of the riser, and "maintenance" refers to operations required for maintaining the condition of the riser, such as cleaning the riser, and "repair" refers to operations for restoring the condition of the riser, such as repairing damage to the riser, and replacing damaged or used components associated with the riser. In FIG. 1, the riser 2 is mounted to a leg 4 of a platform by a plurality of riser offset clamps 6.

The vehicle 10 comprises a primary support structure 12, which acts as a backbone of the vehicle 10. The support structure 12 carries a translation mechanism 14, 16 for causing the vehicle 10 to move along the pipeline 2, as well as one or more modular components, such as the repair module 18 illustrated in FIG. 1. The support structure 12 optionally further carries one or more guide members 20 for guiding movement of the vehicle 10 along the pipeline 2.

The translation mechanism 14, 16, together with the guides 20, is designed to hold the support structure 12 away from riser 2 such that it can move past protuberances 8 on the body of the riser 2, such as the portion of the clamp 6 engaging the riser.

The translation mechanism 14, 16 comprises two gripper arms 14, 16. Each of the gripper arms 14, 16 has a gripper portion 30 shaped to grip the riser 2 and an arm portion 26 for holding the support structure 12 away from the riser 2. When engaged, each of the gripper arms 14, 16 is independently capable of carrying the full weight of the vehicle 10, including any modular components, under the intended operating conditions, e.g. subsea (or in a splash zone or in the air above the sea surface, as the case may be). In preferred embodiments, each of the gripper arms 14, 16 is also capable of supporting the full weight of the vehicle 10 out of the water and may be sufficiently strong to carry additional loading applied to the vehicle 10.

Each of the gripper arms 14, 16 is mounted on the support structure 12 in a manner that allows the respective gripper portions 30 to be moved away from the riser 2. This permits the gripper arms 14, 16 to move past any protuberances 8 on the body of the riser 2. In the illustrated embodiment, the arm portions 26 of the gripper arms 14, 16 are hingedly mounted to the support structure 12 such that they can rotate about an axis parallel to the riser 2 so as to move away from the riser 2.

The first gripper arm 14 is mounted to the support structure 12 such that it does not move in the axial direction of the riser 2. The second gripper arm 16 is mounted to the support structure 12 so as to be translatable with respect to the support structure 12 in the axial direction of the riser 2. A linear actuator 22 is connected at one end to the second gripper arm 16 and at the other end to the support structure 12, so as to effect the axial translation of the second gripper arm 16.

In order to cause the vehicle 10 to translate along the riser 2 in the upwards direction in FIG. 1, the following sequence of actions occur, starting from the position shown in FIG. 1. It will be appreciated that the reverse sequence will move the vehicle 10 in a downwards direction in FIG. 1.

a. The first gripper arm 14 engages and grips the riser 2.

b. The second gripper arm 16 releases the riser 2 and is swung aside, such that the first gripper arm 14 is carrying the weight of the vehicle 10.

c. The actuator 22 is extended to cause the second gripper arm 16 to move past the first gripper arm 14 in the axial direction of the riser.
d. The second gripper arm 16 engages and grips the riser 2.
e. The first gripper arm 14 releases the riser 2 and is swung aside, such that the second gripper arm 16 is carrying the weight of the vehicle 10.
f. The actuator 22 is retracted causing the support structure 12 to be lifted up, moving the first gripper arm 14 past the second gripper arm 16 and returning the vehicle 10 to the position illustrated in FIG. 1.

As will be appreciated, one of the gripper arms 14, 16 is engaged with and gripping the riser 2 at every stage of the movement. Each of the gripper arms 14, 16 is configured so that they will not release the riser 2 in the event of power failure. Thus, should the vehicle 10 suffer a power failure, it will not detach from the riser 2 or move along the riser 2.

This hand-over-hand movement action permits the vehicle 10 to easily traverse protuberances 8 on the riser 2 without becoming disengaged from the riser 2. The range of the actuator 22 is sufficient to allow the second gripper arm 16 to move past both the protuberance 8 and the first gripper arm 14.

Further details of the second gripper arm 16 are illustrated in FIGS. 2 to 5. The first gripper arm 14 operates in substantially the same manner as the second gripper arm 16, except that instead of a sliding mount 24 it has a static mount.

The second gripper arm 16 comprises a sliding mount 24 configured to slide axially along the support structure 12. In the illustrated embodiment, the sliding mount 24 comprises a frame with wheels engaging corresponding tracks of the support structure 12, although alternative connections types may be used.

An arm portion 26 of the gripper arm 16 is connected at one end to the sliding mount 24 by a hinge 28. At the other end of the arm portion 26 is provided a gripper portion 30.

The gripper portion 30 comprises first and second clamp members 32, 34. Each of the clamp members comprises, with reference to FIG. 5, an upper clamp 32a, 34a and a lower clamp 32b, 34b. The upper and lower clamps 32a, 34a, 32b, 34b of each clamp member 32, 34 are held on opposite sides of the riser 2 by a bracket 32c, 34c. The upper clamp 32a of the first clamp member 32 opposes the upper clamp 34a of the second clamp member 34. Similarly, the lower clamp 32b of the first clamp member 32 opposes the lower clamp 34b of the second clamp member 34.

The brackets 32c, 34c are approximately S-shaped when viewed in a direction perpendicular to the axial direction of the riser 2, and approximately U-shaped when viewed in the axial direction of the riser 2. The brackets 32c, 34c are connected to one another so as to pivot about an axis perpendicular to the riser 2. The riser 2 is clamped between the upper clamps 32a, 34a and between the lower clamps 32b, 34b when the lower end 32b of the first clamp member 32 and the upper end 34a of the second clamp member 34 are pushed away from one another.

Figure 2:
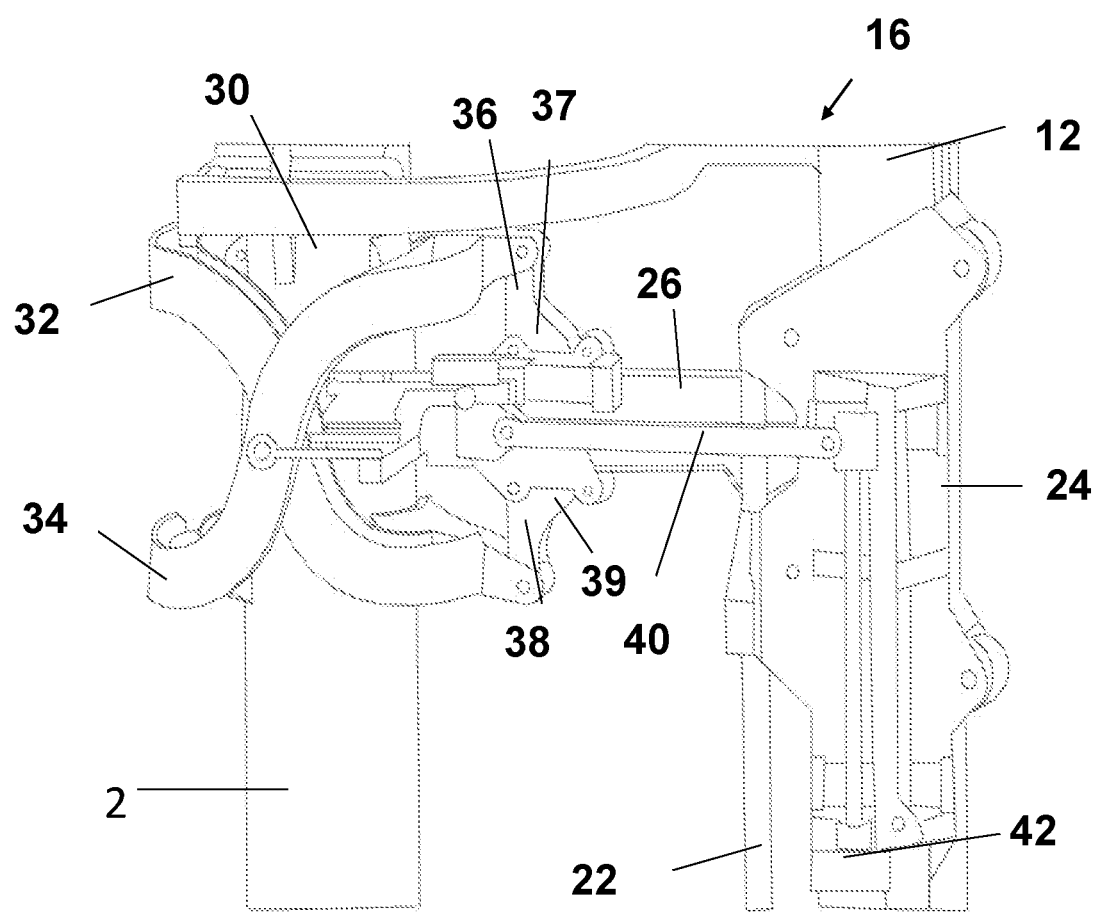
FIG. 2 shows a gripper of the vehicle engaged with the pipeline.

The lower end 32b of the first clamp member 32 and the upper end 34a of the second clamp member 34 are hingedly connected to respective linkage members 36, 38 for causing the clamping portion 30 to clamp the riser 30, as illustrated in FIG. 2. At their other ends, the linkage members 36, 38 are slidably connected to move along the arm portion 26 towards and away from the support structure 12. In this arrangement, the linkage members 36, 38 are connected to a wheeled frame that moves along the arm portion 26, although alternative solutions may also be used.

The linkage members 36, 38 are driven by a clamp driving member 40. At one end, the clamp-driving member 40 is connected to the linkage members 36, 38 so as to slide long the arm portion 26. The other end of the clamp-driving member 40 is connected to the mount 24 so as to be movable in the axial direction of the riser 2. This end of the clamp-driving member 40 is in turn connected to a clamp actuator 42, for driving the clamp portion 30.

When the clamp actuator 42 is in its extended position, the linkage elements 36, 38 hold the clamp members 32, 34 against the riser 2. In this position, the linkage elements 36, 38 are held in a position where they are slightly beyond perpendicular to the axial direction of the arm portion 26. A stop 37, 39 is formed on outer side of each linkage element 36, 38 to prevent further rotation of the linkage elements 32, 34 beyond this position, and hence preventing further translation of the wheeled frame supporting the linkage elements 36, 38. Thus, when the linkage elements 36, 38 are pushed beyond their perpendicular position, they are held in position. The linkage elements 36, 38 are effectively locked in this position because of the flexibility in the mechanism, provided for example by the flexibility of the linkages 36, 38, the frames 32c, 34c and the clamps 32a, 32b, 34a, 34b. Hence a force is required in order to pull the mechanism out of lock (reversing the movement) past the vertical position. Furthermore, any opening force applied to the gripper portion 30 drives the linkages further into lock and is counteracted by the stops 37, 39. As a result, little to no resistance is required from the clamp actuator 42 to hold the gripper portion 30 closed, and thus it remains gripped should power to the clamp actuator 42 fail. The end position is controlled by the stops 37, 39 on the linkage elements or by limiting the stroke of the actuation mechanism.

To release the gripper portion 30, a pulling force must be applied to the linkage elements 36, 38 to move them out of the locked position and past the perpendicular (neutral/equilibrium) point. This pulling force is applied by the actuator 42, which is retracted first to an intermediate position, shown in FIG. 3. This movement causes the linkage members 36, 38 to move along the arm portion 26 towards the support structure 12. In doing so, the lower end of the first clamp member 32 and the upper end of the second clamp member 34 are brought towards each other, causing them to release the clamps 32a, 32n 34a, 34b from the riser 2.

Figure 4:
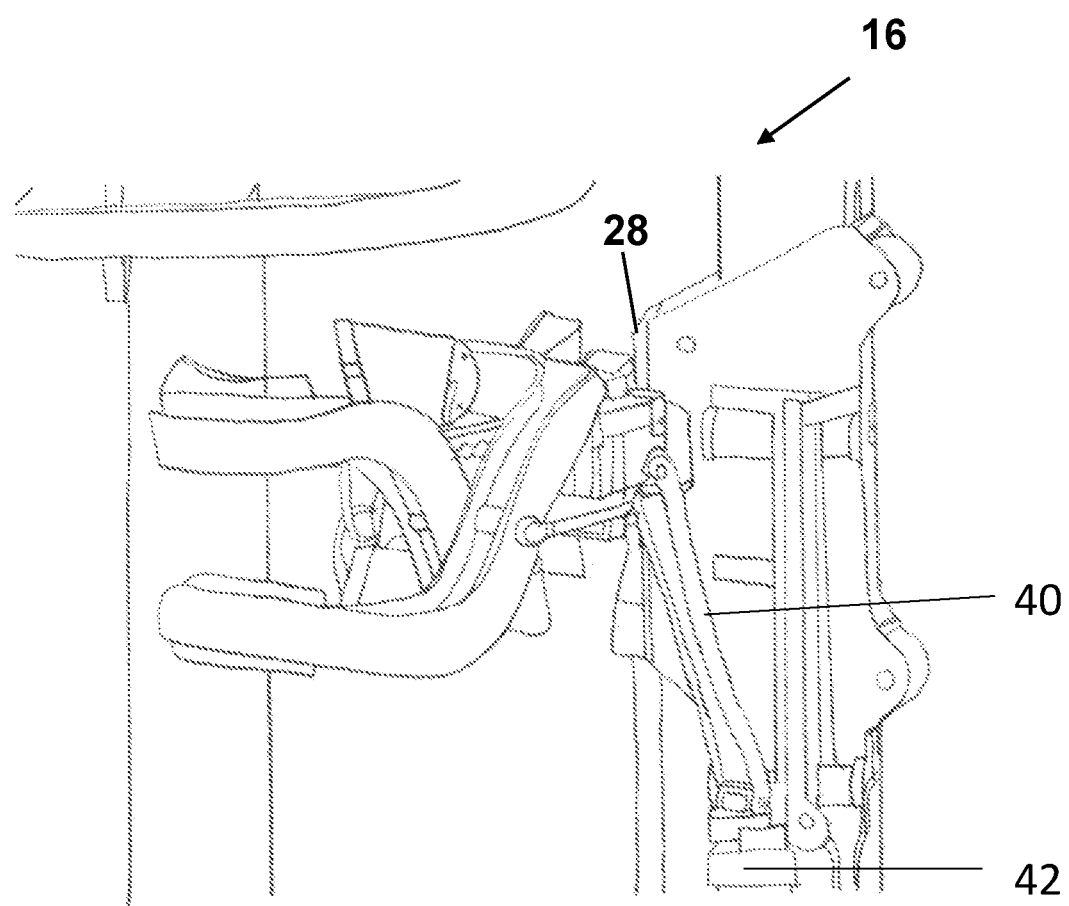
FIG. 4 shows the gripper of the vehicle disengaged from the pipeline.

The extension/retraction direction of the clamp actuator 42 is offset from the axis of the hinge 28 in a direction perpendicular to the direction of the arm 26 when engaged with the riser. Thus, when the wheeled frame reaches the limit of its movement along the arm portion 26, the continued retraction of the actuator 42 causes the arm to swing towards the actuator 42 and away from the riser 2. This position is illustrated in FIG. 4.

Figure 3:
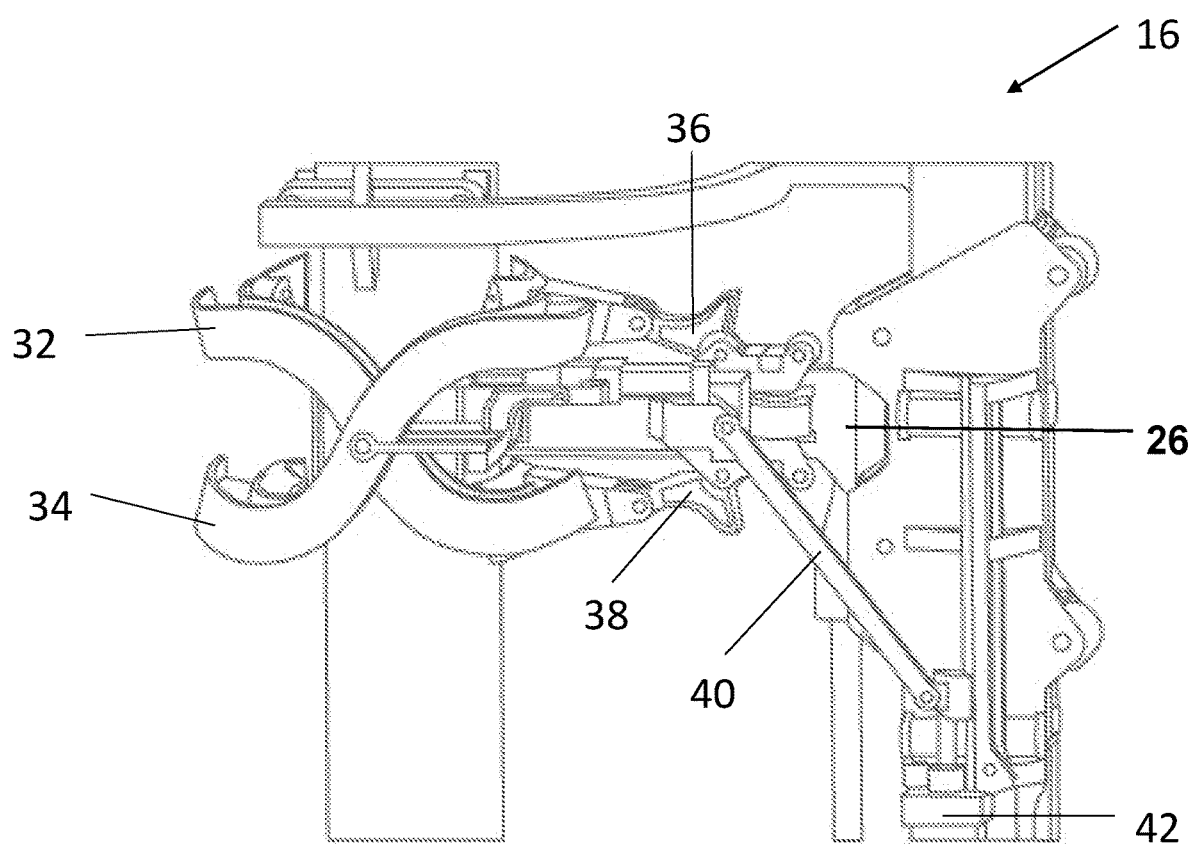
FIG. 3 shows the gripper of the vehicle releasing the pipeline.
Figure 5:
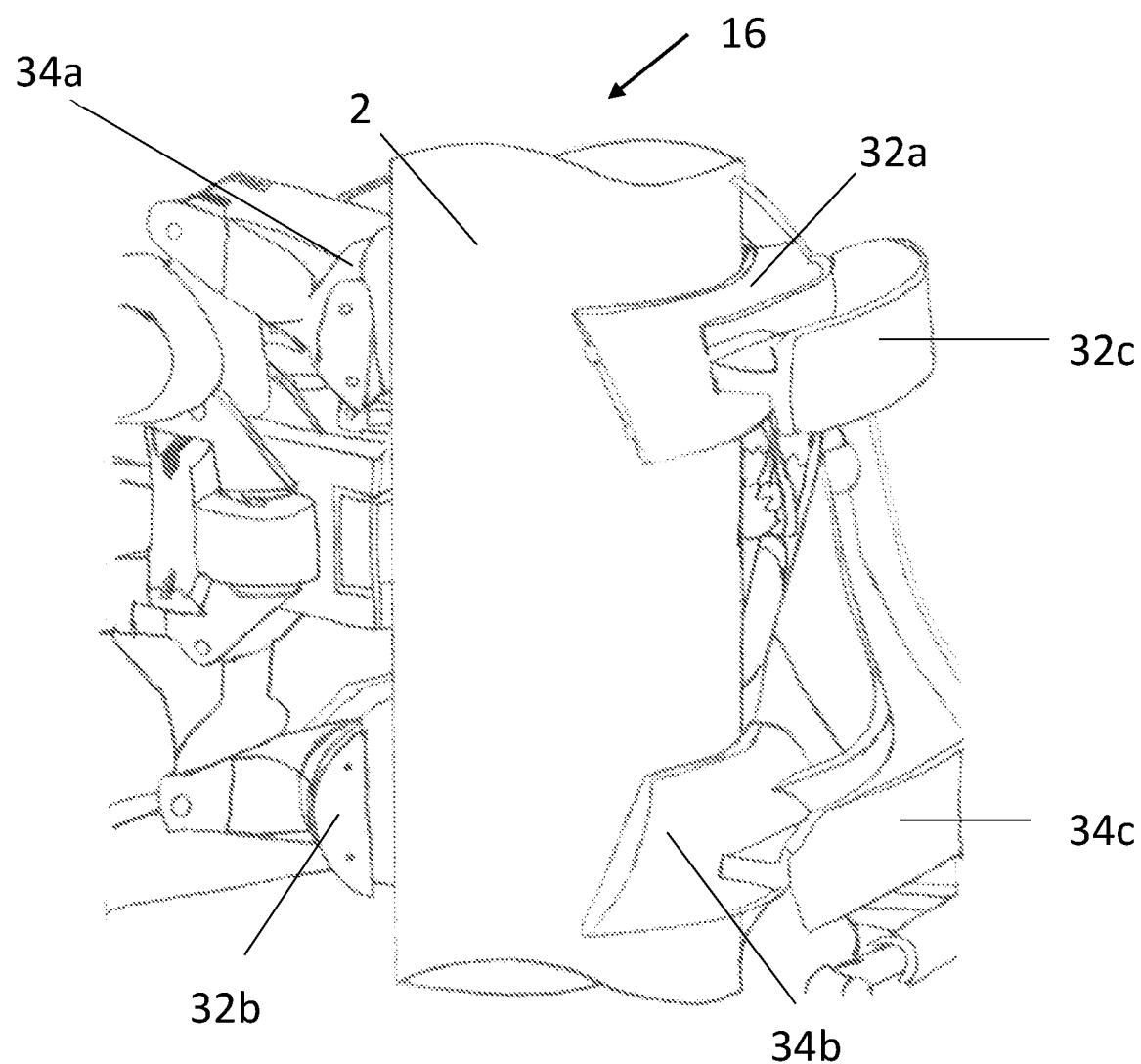
FIG. 5 shows details of the reverse side of the gripper shown in FIGS. 2 to 4.

FIG. 5 illustrates details of the gripper portion 30 of the second gripper arm 16 in its clamped position from the reverse side to that shown in FIG. 3.

The vehicle 10 is adapted to rotate around the axis of the riser 2, preferably so as to be able to rotate completely around the riser 2. This permits the vehicle 10 to rotate to the optimal angle to pass a protuberance 6. For example, the riser 2 may have multiple protuberances extending in different directions from the riser 2, thus meaning that the vehicle 10 must be re-orientated part way along the riser 2. In some embodiment, the vehicle 10 may rotate to position tools or operational modules in the correct position.

To provide this rotation function, each of the clamps 32a, 32b, 34a, 34b comprises a housing and a friction pad. The friction pad is movable with respect to the housing. Thus, by relative movement of the friction pad and the housing, it is possible to rotate the vehicle 10 about the riser 2, when the first gripper arm 14 is disengaged from the riser 2 (or where the first gripper arm 14 also rotates its friction pads correspondingly).

Each friction pad and housing only needs a relatively small degree of movement because the rotation can be applied in a step-wise manner. For example, after rotation of the vehicle 10, the first gripper arm 14 can be engaged and the second gripper arm 16 released. The friction pads can be reset to their neutral position. The second gripper arm 16 can be re-engaged (and the second gripper arm 14 released if necessary) and the rotation process repeated.

The rotation process can be repeated until a desired degree of rotation is achieved. This allows the vehicle 10 to be completely rotated around the riser. Thus, the vehicle 10 can be aligned to pass a protuberance 8 on the riser 2 or, for example, to pass through a narrow opening on one side of the riser 2.

A method of using the vehicle 10 may comprise translating the vehicle 10 to a target axial location along the riser 2 and rotating the vehicle 2 around an axis of the riser 2 to achieve a desired degree of rotation. After achieving the desired rotation, the method may further comprise translating the vehicle 10 past a protuberance 6 on the riser 6. Alternatively, or additionally, the method may comprise, after achieving the desired rotation, performing an operation on the riser 2 using the vehicle 10.

Figure 6:
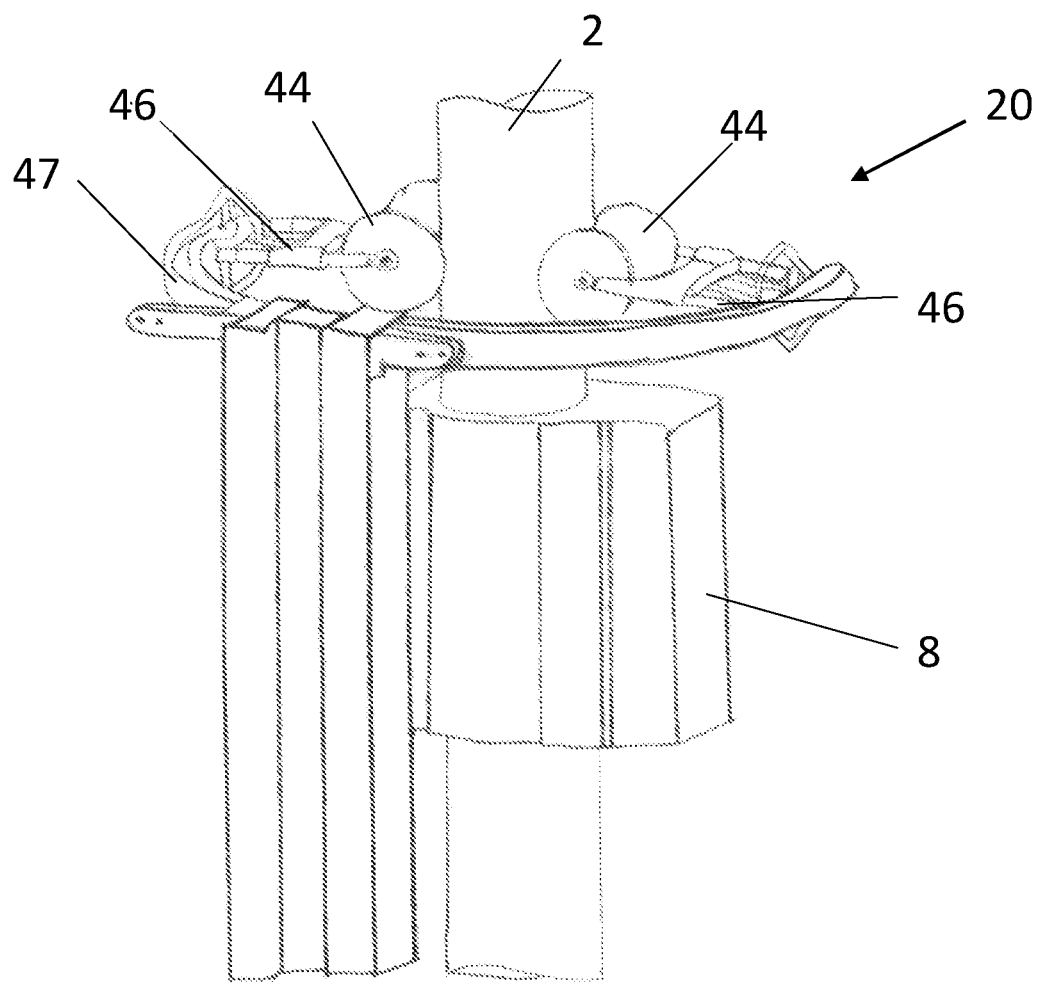
FIG. 6 shows an alternative rolling guide member of the vehicle engaged with the pipeline.
Figure 7:
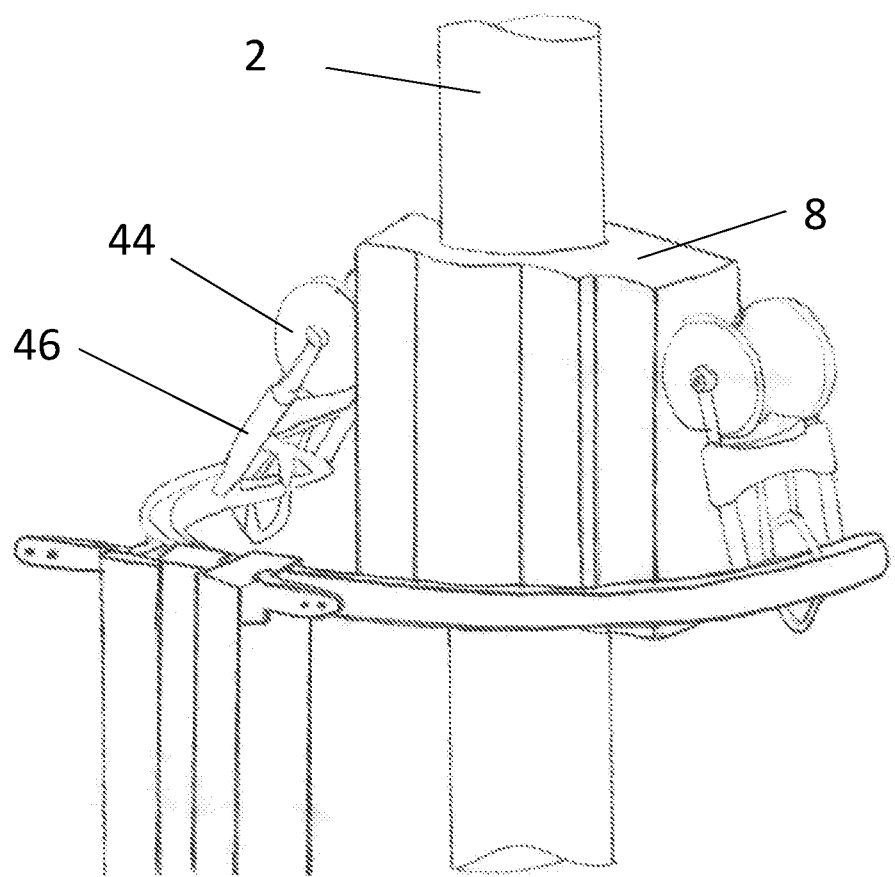
FIG. 7 shows the rolling guide member of FIG. 6 passing a protuberance on the pipeline.

FIGS. 6 and 7 show details of a guide 20 for use with the vehicle 10. The guide 20 comprises two rollers 44 shaped to engage the riser 2. Each roller 44 is supported by a guide arm 46 that is pivotally connected to a yoke 47 mounted to the support structure 12. The guide arm 46 in the illustrated arrangement is biased towards a neutral position where the guide arms 46 extend substantially perpendicular to the riser 2 and hold the rollers in contact with the riser 2. However, in alternative embodiments, the position of the guide arms 46 may be actively controlled by other means, for example using a rotational actuator or the like.

When the guide 20 reaches a protuberance 8 on the riser 2, the rollers 44 are pushed away from the neutral position to allow them to pass over the protuberance. After passing, the rollers 44 are biased back to their neutral position to engage the riser 2 on the other side.

Whilst the guide arm 46 in the illustrated arrangement is biased towards a neutral position, in alternative embodiments, the position of the guide arms 46 may be actively controlled by other means, for example using a rotational actuator or the like.

The guide 20 illustrated in FIGS. 6 and 7 differs from the guides 20a, 20b, 20c shown in FIG. 1. In FIG. 1, the arms of the yokes 47 of the guides 20a, 20b, 20c are instead pivotable about an axis parallel to the axis of the riser 2 to disengage the rollers 44 from the riser 2. In this arrangement, the engagement and disengagement of the guide 10 is actively controlled by a controller of the vehicle 10.

Figure 8:
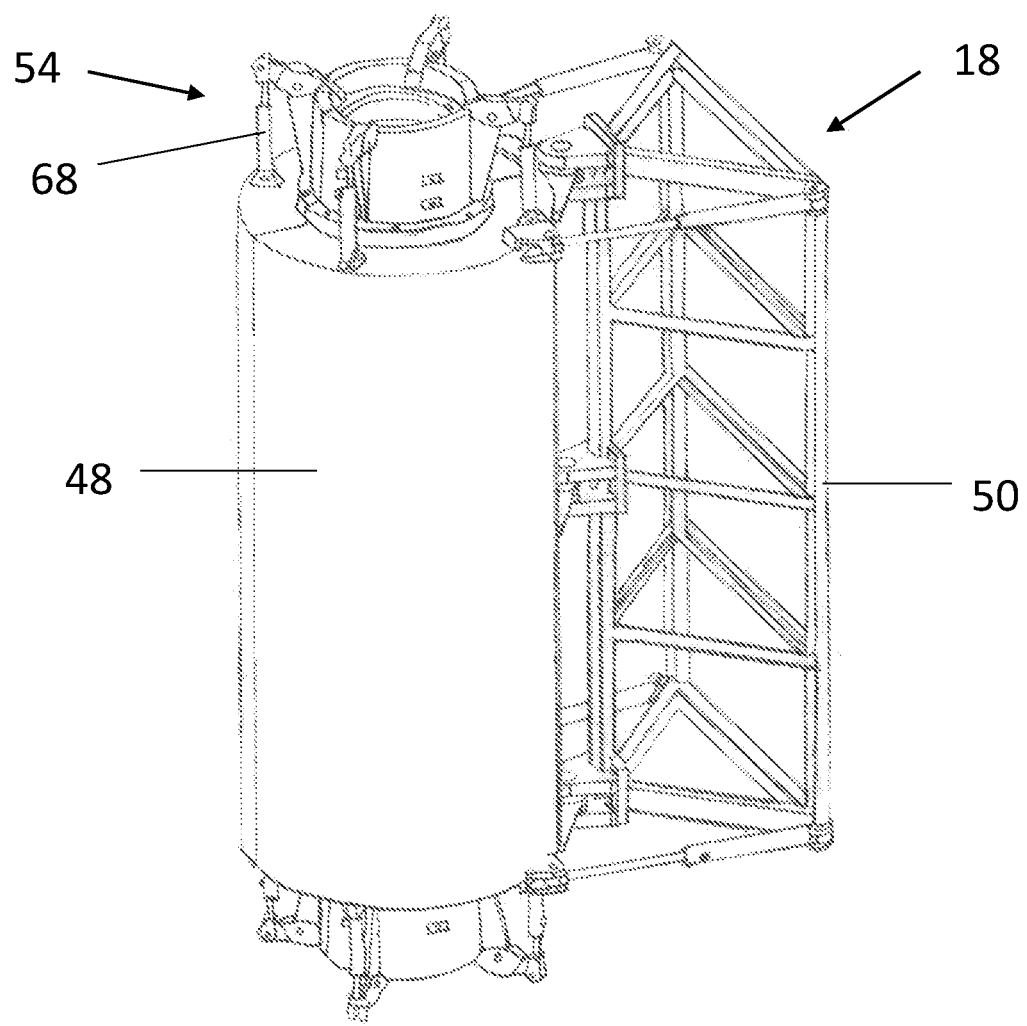
FIG. 8 shows details of a repair module to be carried by the vehicle.
Figure 9:
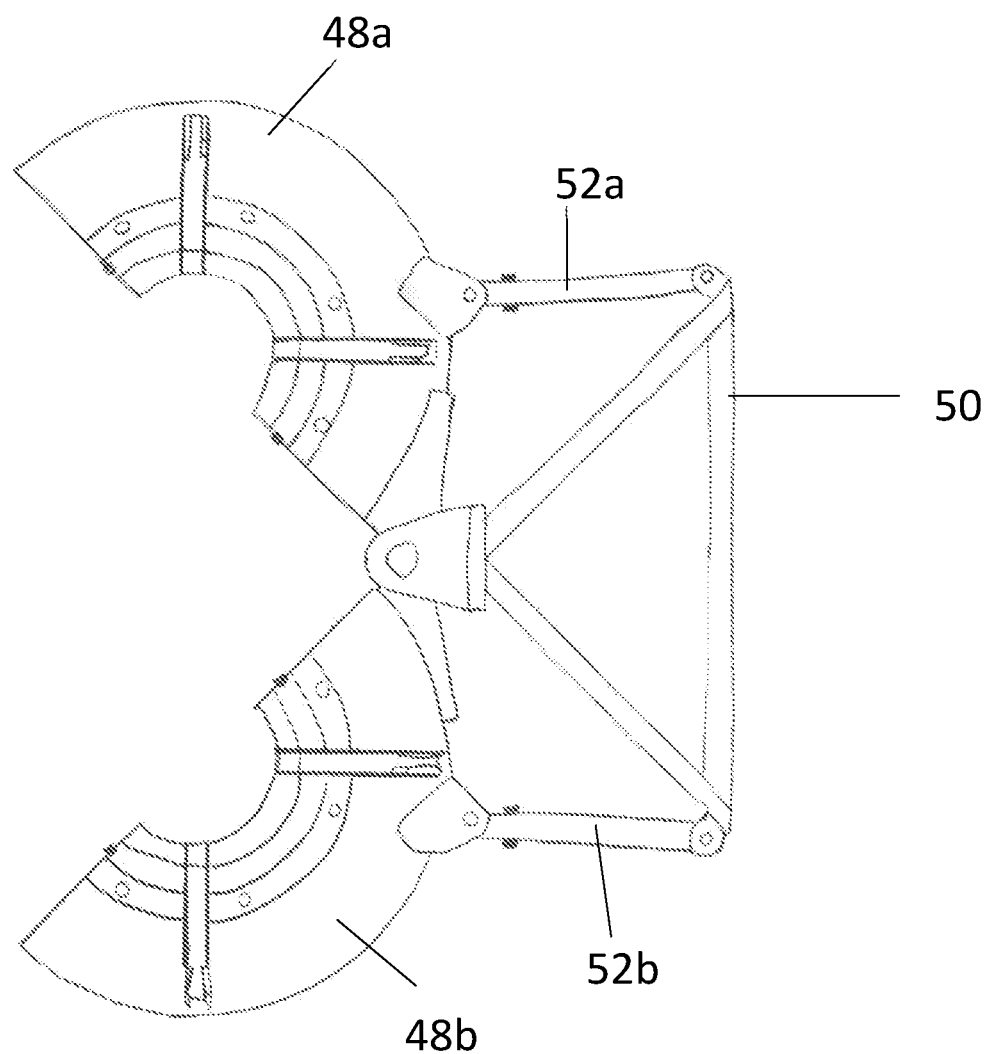
FIG. 9 shows the repair module viewed in an axial direction in its open position.
Figure 10:
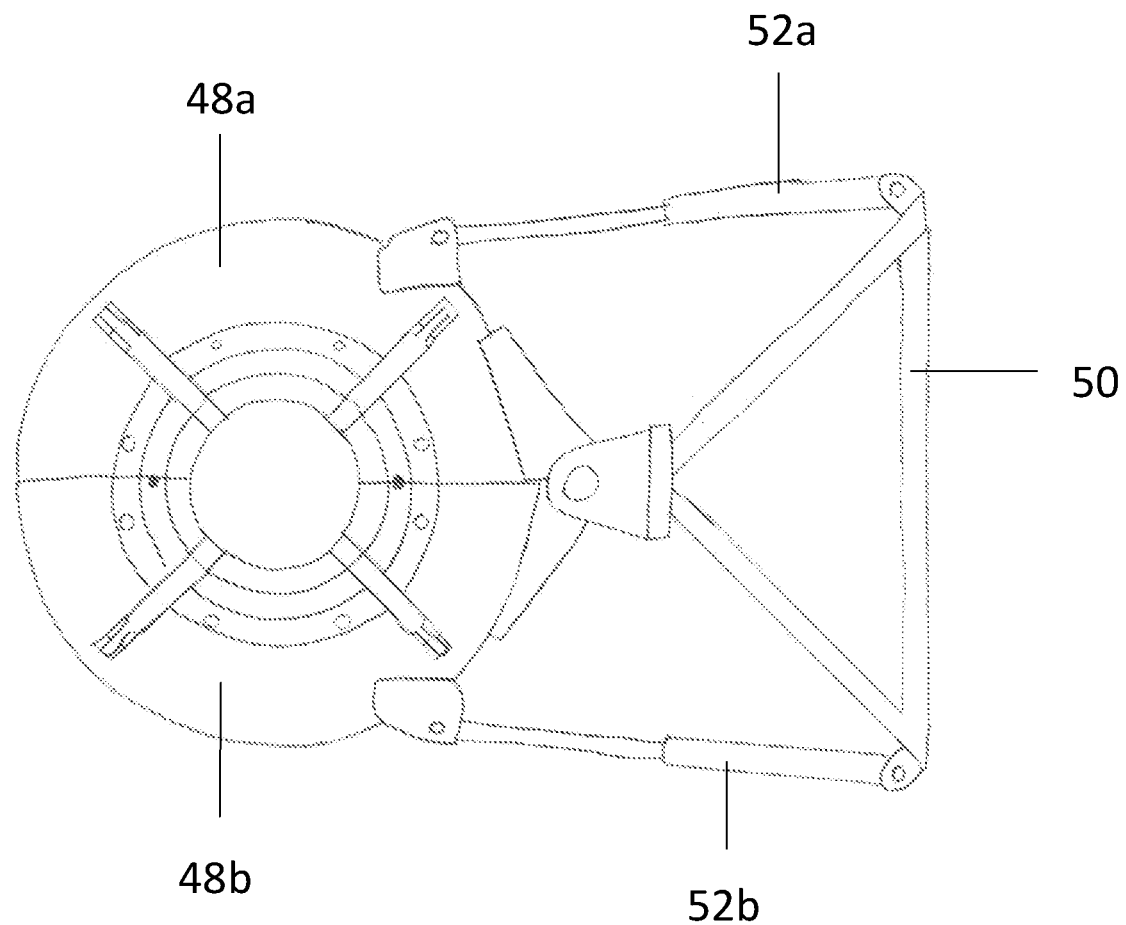
FIG. 10 shows the repair module viewed in an axial direction in its closed position.

FIGS. 8 to 10 illustrate a repair module 18 to be carried by the vehicle 10. The repair module 18 is a variation of the module described in WO2012/013847 (also published in English as EP2600051A4).

The repair module 18 is a re-usable repair module. It may comprise a housing 48 shaped to surround the riser 2, establishing a sealed chamber between the housing 48 and the riser 2. Once the sealed chamber has been established, the repair module 18 may be capable of draining water from the sealed chamber and may be performing a repair on the riser 2 using a self-contained riser repair apparatus, as described in WO2012/013847. It is envisaged that an umbilical may connect the repair module 18 to the surface to supply a source of fluid for expelling water from the sealed chamber. The fluid may be air or other gas, pure water, a cleaning fluid or other agent. In some arrangements the vehicle 10 or repair module 18 may include a local source of pressurised gas or other agent to supply the fluid.

Whilst the housing 48 is described in combination with the repair module 18 in this embodiment, in other embodiments the housing 48 may be used in combination with other operational modules, e.g. so as to provide a controlled environment for performing the respective operation on the riser 2.

The housing 48 of the repair module 18 comprises two housing segments 48a, 48b. When engaged with one another around a riser 2, the housing segments 48a, 48b form the sealed chamber. The housing segments 48a, 48b are similar in nature to those described in WO2012/013847. However, instead of being separated by linear movement, the housing segments 48a, 48b are separated by a rotational movement about a pivot axis, as illustrated in FIGS. 9 and 10.

Also contrary to WO2012/013847, the repair module 18 illustrated in FIGS. 8 to 10 does not include collar segments for causing the repair module 18 to translate along the riser 2. Instead, the repair module 18 is carried by the support structure 12 via a frame 50, although alternative structure types may be used in place of the frame 50. The frame 50 is capable of carrying the weight of the repair module 18 both subsea, in the splash zone and above the sea surface. The frame 50 provides pivots about which the housing segments 48a, 48b rotate to engage or disengage the riser 2. The frame 50 is shaped so that the housing segments 48a, 48b will close around the riser 2 when mounted to the support structure 12 of the vehicle 10, which is held at a predetermined distance from the riser 2 by the gripper arms 14, 16 and the guides 20.

The movement of each of the housing segments 48a, 48b is controlled by a respective actuator 52a, 52b mounted between the frame 50 and the housing segment 48a, 48b, although alternative actuator types may be used. When in their separated position, the housing segments 48a, 48b are capable of passing a protuberance 8 on the riser 6.

To seal against one another, at least one of the housing segments 48a, 48b includes a seal along its free edges. Since the housing segments 48a, 48b are manufactured and maintained to a high precision, a relatively simple seal can be used for sealing between the two housing segments 48a, 48b. However, sealing against the riser 2 itself is more difficult as the riser 2 is exposed to weathering and will often be heavily corroded or worn. Indeed, since part of the riser 2 requires repair, it is likely that the adjacent portion of the riser 2 where the housing 48 must seal will also be damaged.

Figure 11:
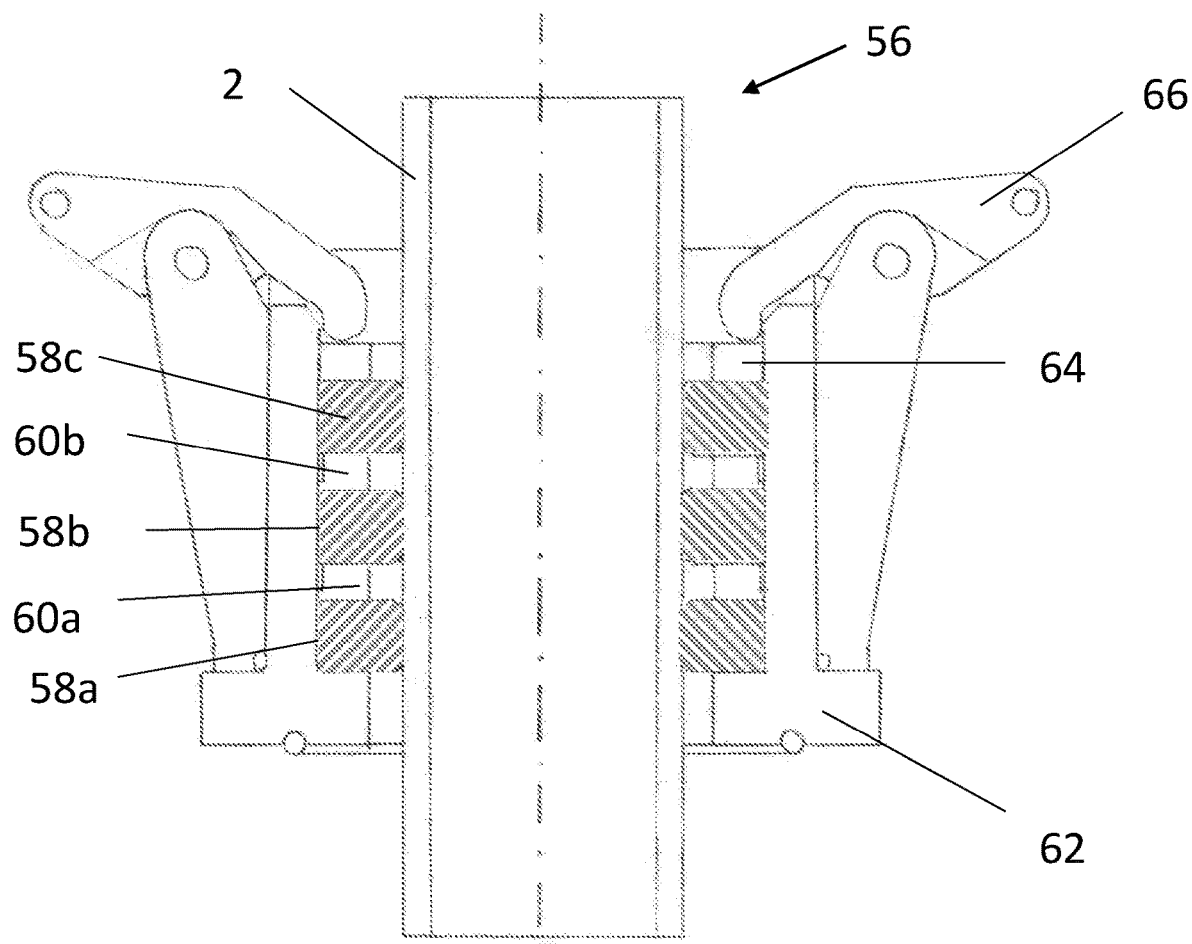
FIG. 11 shows a cross-section through a pipeline seal of the repair module.
Figure 12:
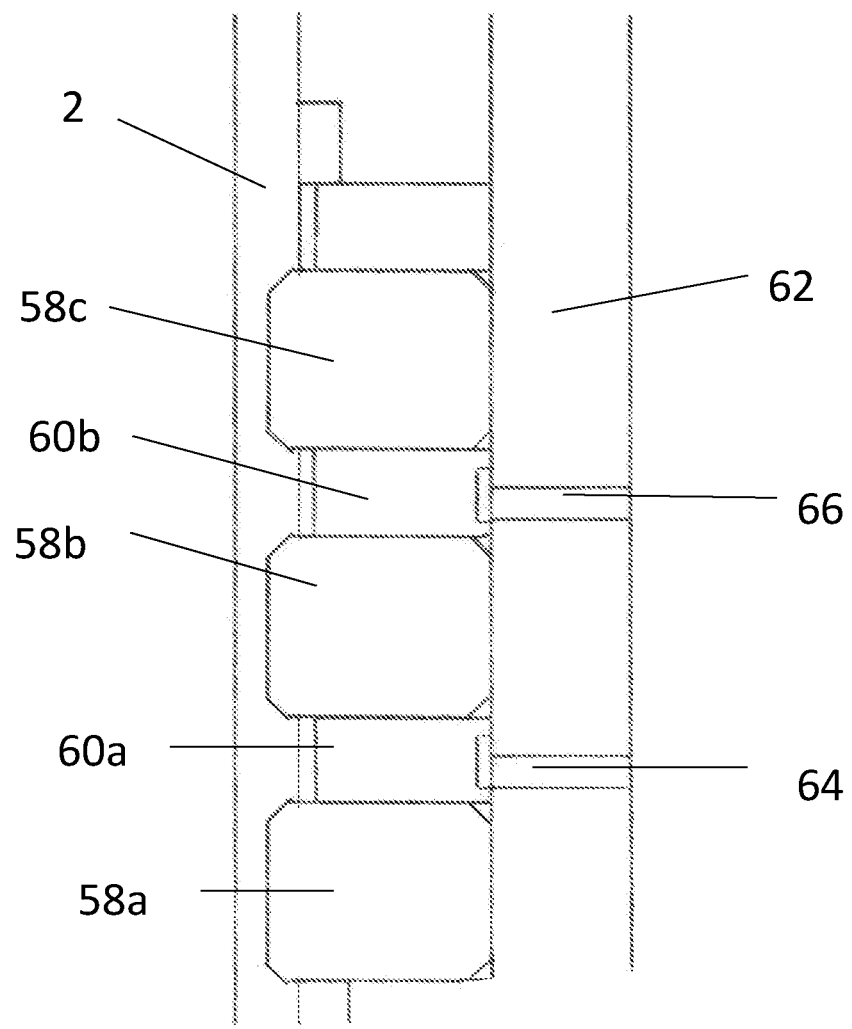
FIG. 12 shows another cross-section through the pipeline seal showing access conduits.

FIGS. 11 and 12 illustrate a sealing arrangement 56 for sealing the housing 48 against the riser 2. The sealing arrangement 56 is formed in two parts, one provided on each of the respective housing segments 48a, 48b, which are brought together when the housing 48 is sealed against the riser 2.

The sealing arrangement 56 comprises a seal stack including at least three sealing elements 58. The seal elements 58 are shaped to surround the riser 2 when the housing is closed, and will usually each be approximately semi-annular so as to form an approximately annular seal. The sealing elements 58 are formed from an elastomeric material such that, when pressure is applied to the stack in an axial direction, the sealing elements 58 will expand in a radial direction causing them to seal against the riser 2.

Between each of the sealing elements 58 is provided a spacer 60, in this case in the form of a compression ring 60. The functionality of the spacer 60 is twofold. Each spacer 60 provides even axial compression and is also furnished with channels to allow for draining water or balancing of pressure, as will be discussed below. The spacers 60 are formed from a stiffer material, such as steel, so as to distribute a compressive force applied to the seal stack.

The sealing arrangement further comprises a compression assembly for applying an axial compression to the seal stack. The compression assembly comprises a rigid frame 62 for supporting one axial end of the seal stack and means for compressing the seal stack against the rigid frame 62. In the illustrated embodiment, the means comprises a compression ring 64, a plurality of lever arms 66 mounted to the frame for applying a compressive force to the compression ring 64, and a plurality of actuators 68 (shown in FIG. 8) for actuating the lever arms 66, although alternative actuator types may be used. In further alternative arrangements, a similar compressive force can be applied using a threaded device (e.g. a nut) that is screwed down, pushing on the compression ring 64.

Whilst the compression of the sealing members 58 may be sufficient to seal against the riser 2, in many cases the surface to the riser will be too uneven for the seals alone.

FIG. 12 illustrates aspects of the sealing arrangement 54 which provide enhanced sealing in the case of a riser 2 having a poor surface for sealing.

Between the innermost sealing member 58a and the intermediate sealing member 58b, a pressurised gas barrier is formed. The pressurised gas barrier should be at a pressure higher than ambient sea pressure, such that a positive pressure differential is created across the intermediate sealing member 58a in the outward direction. Thus, even if an imperfect seal is formed between the riser 2 and the seal assembly 54, the water cannot enter the sealed chamber.

The pressurised gas barrier is formed by injecting pressurised gas, ideally the same gas as is used inside the sealed chamber the repair module 18, into the space between the two sealing members 58a, 58b via a compressed gas passageway 64 formed through the frame 62. The barrier gas pressure shall be above external pressure. For example, at 50 meters below sea level, the ambient water pressure would be 5 bar and so the barrier pressure should be more than 5 bar to provide a margin and "positive drag" to push out any leaking water. In some arrangements, the gas pressure may be controlled based on the ambient pressure. In others, a constant pressure may be used that is above a maximum expected ambient pressure. It will be appreciated that the frame 62 must be otherwise airtight. One or more gas passageways may also be formed in the respective compression ring 60a.

The space between the intermediate sealing member 58b and the outermost sealing member 58c is connected to a sump (not shown) via a drain line 66. Any water passing the outermost sealing member 58c is thus drained from the seal assembly to minimise a pressure applied to subsequent seal members. As above, one or more drain passageways may also be formed in the respective compression ring 60b.

The water is preferably drained by gravity. The sump may be a simple container, or may alternatively include a pump for draining the sump.

Where more than three sealing members 58 are present, a drain line 66 may be connected to the region between each of the seal members 58.

The sealing assembly 54 has a modular arrangement such that the sealing elements 58 can be easily replaced to conform to a particular riser. For example, different risers may have different shapes or diameters, or may require different materials to ensure a seal. The sealing elements 58 and compression rings 60 may thus be provided as a cartridge that can be released from the respective halves of the sealing assembly 54 when the housing 48 is in the open position, and a new sealing element cartridge inserted in its place.

Although it may be powered by batteries, the vehicle 10 is preferably powered by means of an umbilical. When the vehicle 10 is performing repairs, according to a preferred embodiment by means of the repair module 18 enabling dry in-situ repairs, direct link to the atmosphere via a tube integrated to the umbilical or installed beside is preferred. Such an arrangement allows emptying of sea water from the housing 48 and/or supply of drying and/or cleaning and/or repair fluids. It further enables gravity drainage of a sump of the seal arrangement 56 which is part of the preferred housing 48 described herein. Incorporated or associated with the umbilical may be other tubes connecting the vehicle 10 topside, which may provide fluid chemicals for repair or other operations, or compressed fluids for one or more of cleaning, drying, repair or the like.

The vehicle 10 may also perform installation operations, such as deploying a new cable linking a platform to a subsea unit. A module on the vehicle 10 will carry a roll of cable connected to the platform, and translate down the riser 2 to the seafloor, where for example a ROV will finalise connection to the subsea unit. In an alternative arrangement, the roll of cable may instead be mounted on the platform and an end of the cable may be carried by the vehicle 10, with the cable being unrolled at the vehicle 10 translates down the riser 2.

As mentioned previously, the vehicle 10 is configured to be modular so as to carry a different payload for different operations. For example, the vehicle 10 may comprise one or more universal connections to which different modules may be connected, the universal connections being configured to support the weight of the module as well as supplying power and control. In alternative arrangements, the modules may be connected in other manners, such as using separate connections for structural connections, control connections and power connections.

The vehicle 10 can carry one or several modules at a time.

When carrying several modules, the vehicle 10 can operate with one module active at a time, or several modules active simultaneously. For example, one can imagine having cleaning performed under camera inspection.

The vehicle 10 may carry several modules, although all of them are not necessarily connected and powered. For example, one may consider one active module connection, to which the module to be operated can be selected on the vehicle—the vehicle 10 functioning thus also as a kind of "tool rack"—and connected, topside or underwater using for example to an automatically tool swap subsystem (not shown) installed on the vehicle 10.

Figure 13:
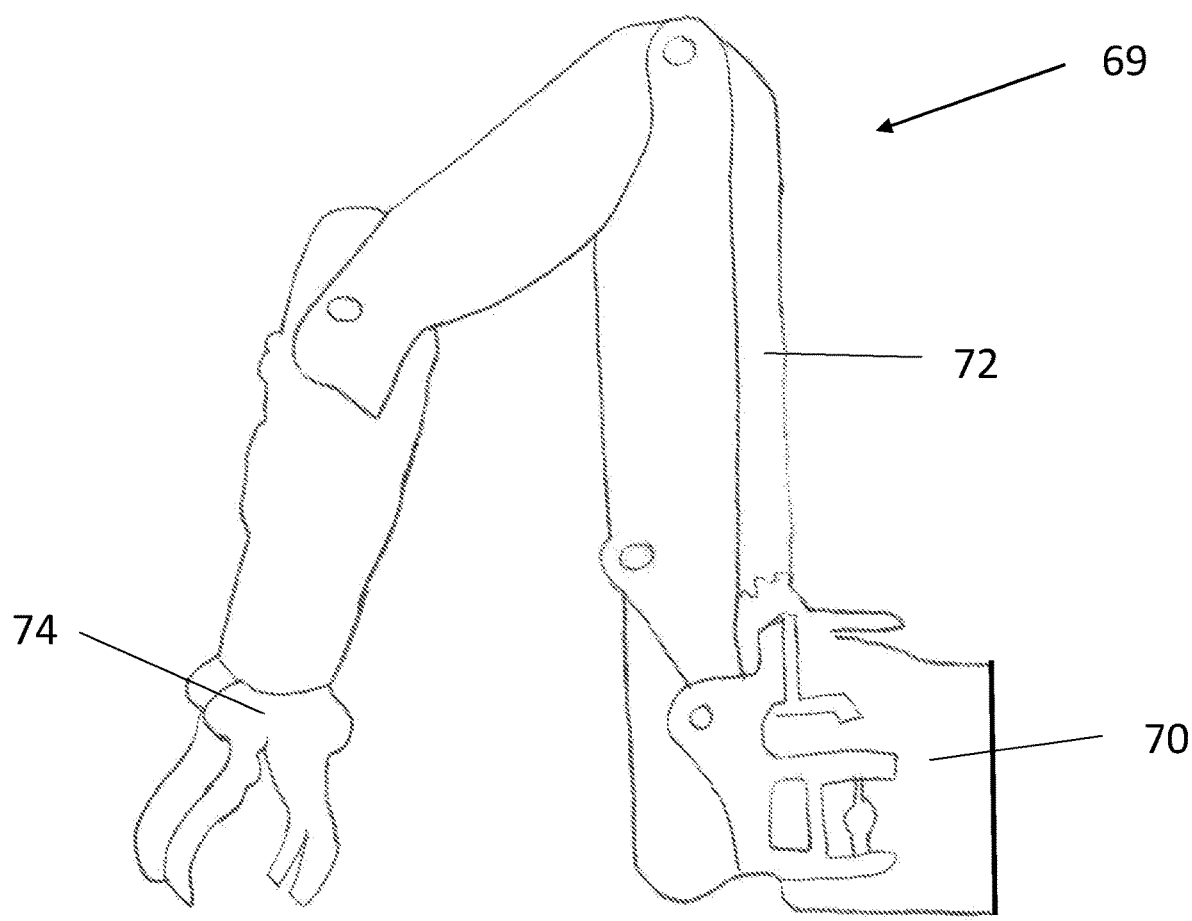
FIG. 13 shows a robotic arm to be carried by the vehicle.

In one mode of operation, the repair module 18 may be supplemented by or replaced instead by one or more robotic arm modules 69, such as illustrated in FIG. 13.

The robotic arm module 69 comprises a mount 70 for attachment to the support structure 12 of the vehicle 10. The robotic arm module 69 further comprises an articulated arm 72 with a manipulator 74 at the end. Such arms modules 68 are commonly used on remotely operated underwater vehicles (ROVs) used in the prior art for maintenance of risers 2.

Figure 14:
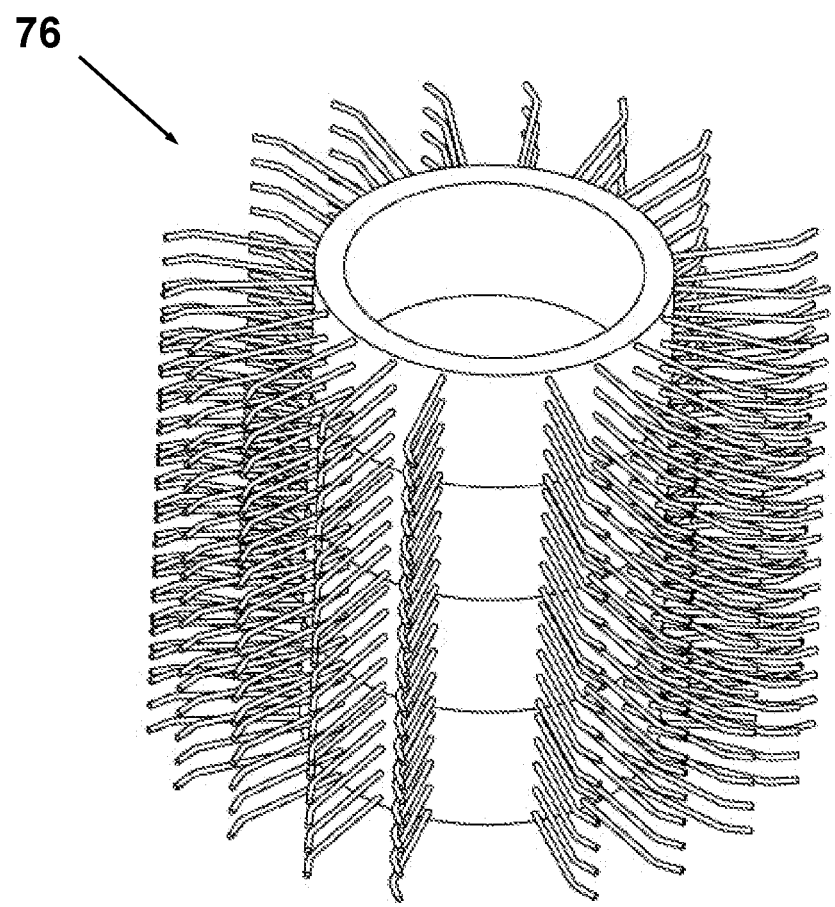
FIG. 14 shows a cleaning tool to be carried by the robotic arm.
Figure 15:
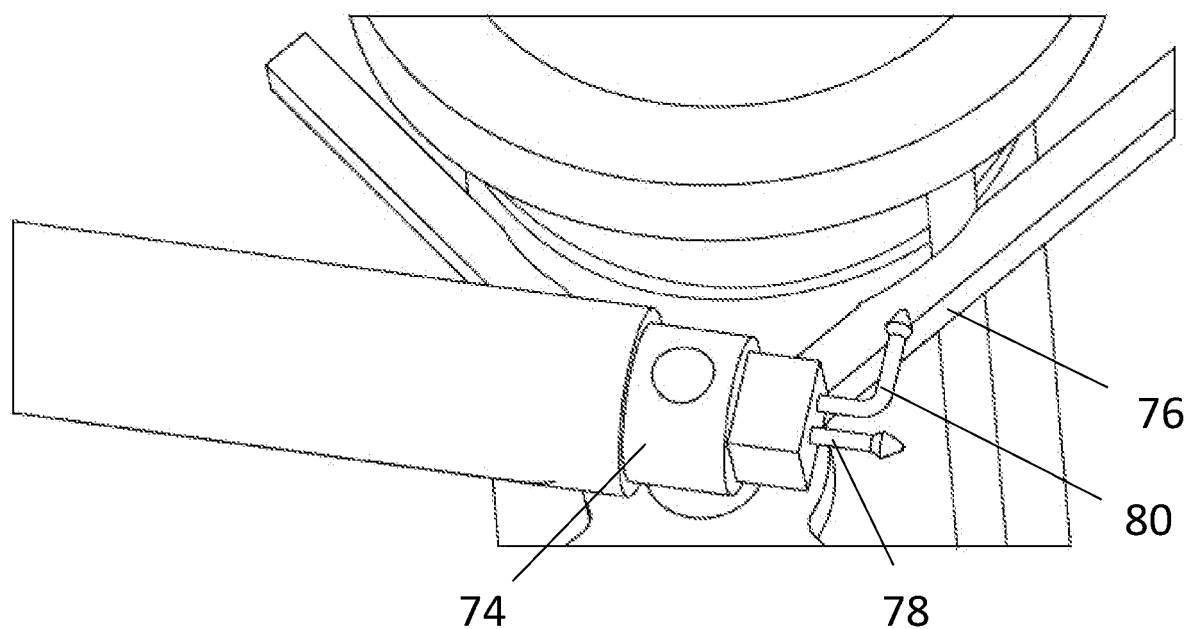
FIG. 15 shows an alternative cleaning tool carried by the robotic arm.

In one embodiment, the manipulator 74 may be configured to hold (or replaced with) a cleaning tool 76, 76', as illustrated in FIGS. 14 and 15. The cleaning tool illustrated in FIG. 14 comprises a rotating brush. The illustrated cleaning tool in FIG. 15 comprises a plurality of outwardly extending elastomeric cleaning elements that are rotatable by a rotor so as to repeatedly impact against a surface of the riser 2.

The manipulator 74 may further be modified to include water nozzles 78, 80 to provide cleaning, in addition to the cleaning tool 76, as shown in FIG. 15. The water nozzles 78, 80 allow for improved cleaning of parts that are too small or delicate to be cleaned using the cleaning tool 74 and/or spraying of the riser 2 above sea level to lubricate the cleaning action of the cleaning tool 76.

In a preferred mode of operation, the vehicle 10 can be used to carry out a routine maintenance and inspection process on a riser 2.

During a first process, the vehicle 10 is loaded with the cleaning module (such as the robotic arm module 69 including the cleaning tool 76) and passes along the length of the riser 2 removing accumulated matter. The vehicle 10 then returns to the surface where the cleaning module is detached.

During a second process, the vehicle 10 is loaded with an inspection module. Whilst such a module is not described in detail herein, suitable inspection devices are well-known in the technical field. The inspection module should be capable of performing non-destructive testing (NDT) of the riser 2 to determine where repairs are required. The vehicle 10 then returns to the surface where the inspection module is detached.

During a third process, assuming such a repair site is identified, the vehicle 10 is loaded with the repair module 18. The vehicle translates along the riser 2 until it reaches the repair site where the two segments of the housing 48 are sealed around the riser 2 and a repair is carried out. Once the repair is complete, the vehicle 10 will return to the surface where the repair module is detached.

During the repair, should the repair module 18 detect that insufficient sealing has been achieved by one or both of the sealing arrangements 54 at its ends, then the vehicle 18 will first attempt to move along the riser 2 in either direction to achieve an improved seal. If, after a predetermined number of attempts, insufficient sealing can be achieved to ensure a dry environment, one may decide to return the vehicle 10 to the surface. One or more further cleaning processes, such as described above, may then be carried out to attempt to obtain a good seal, or an alternate method of repair or replacement may be used. For example, the sealing elements 58 can be replaced with elements having improved sealing properties for a rough surface, such as softer and thicker rubber. If no satisfactory sealing can be achieved, a "wet" repair method can be selected.

The vehicle 10 may be configured to engage with a secondary vehicle, for example an unmanned underwater vehicle (UUV), such as a remotely operated underwater vehicle (ROUV) or an autonomous underwater vehicle (AUV). The vehicle 10 may, for example, include connections to permit subsea supply or resupply of the vehicle 10 by the secondary vehicle or the secondary vehicle by the (primary) vehicle 10. The supply or resupply may be of power, fuel, operational materials or the like. The connections may be provided as part of one of the modules or elsewhere on the vehicle 10.

The connector for the secondary vehicle may comprise one or more locking elements to avoid uncontrolled release of the secondary vehicle when engaged with the primary vehicle 10. The connector may comprise guide elements for guiding the secondary vehicle into a correct position to be engage the primary vehicle, for example so as to engage the locking element(s).

The connector for the secondary vehicle may include a wet-mate subsea connector for supply of electrical power with the secondary vehicle when docked with the primary vehicle 10 and/or for exchange of data between the secondary vehicle and the primary vehicle 10. The connector for the secondary vehicle may use electrical communication (e.g. via copper contacts/cables) or optical communication (e.g. via optical fiber contacts/cables).

Whilst the embodiments described above describe the vehicle 10 in use on a riser 2, it will be appreciated that the vehicle 10 may be used to carry a payload along any elongate structure having a substantially uniform cross-section. Other subsea examples include, for example, pipelines or platform legs. In one example embodiment, the vehicle 10 could be used on an underwater elongated body associated with a wind turbine tower. In further embodiments, the vehicle 10 may be used on elongate bodies above water. In yet further examples, the device may be used topside also, for example to climb pipes or scaffolding for other maintenance purposes.

Furthermore, whilst the described riser 2 is illustrated in a vertical orientation, it will be appreciated that the vehicle 10 may be used in combination with elongate structures having any orientation. For example, the vehicle 10 may be used on horizontal pipelines.

Whilst the support structure 12 illustrated in the present embodiment comprises a single, elongate structural member, it is still capable of following a riser 2 having a small degree of curvature, as might be expected for a riser 2. For more complex structures, however, the support structure 12 may comprise an articulated member, having two or more hinged sections. Optionally, each hinged section may comprise a pair of gripper arms operating in a similar manner to the first and second gripper arms 14, 16 described above. Indeed, in some embodiment, multiple pairs of gripper arms 14, 16 may be employed even for a support structure 12 comprising only a single rigid body.

In a further embodiment, whilst the first gripper arm 14 is illustrated as being a fixed, it may alternatively be embodied as a sliding gripper arm, similar to the second gripper arm 16.

In further embodiments, the vehicle 10 may be used for the purpose of subsea debris survey and/or removal. For example, the vehicle 10 may use an inspection module to inspect an area surrounding the riser 2. The vehicle 10 may additionally or alternatively use a manipulator module, such as the robotic arm 69, to collect articles on or around the riser 2. The vehicle 10 may comprise a container for storing collected matter. Thus, the vehicle 10 may be used to bring collected material to a platform or other collection location.

In a further embodiment, the vehicle 10 may be used to provide a local communication hub between one or more subsea units and a unit on the surface. For example, the vehicle 10 may be equipped with a communication module for communication with subsea units such as ROVs (remotely operated vehicles). The communication unit may use wireless communication or wired communication. The vehicle 10 may comprise a wired line connecting to the unit on the surface. For example, the wired line may run alongside an umbilical such as those discussed above for supplying power or fluids for use on the vehicle 10. Alternatively, wireless communication may be used as larger antennas and amplifiers can be mounted to the vehicle 10 than on ROVs.

In a further embodiment, the vehicle 10 can comprise a memory unit for storing data collected subsea. For example, the data may comprise underwater surveillance data, which could for example be relayed by a subsea vehicle or could be collected by an inspection module mounted In yet further embodiments, the vehicle 10 may be mounted with an offensive module and/or defensive module. The vehicle 10 may thus be configured to engage in warfare, or to enhance the security of a platform installation associated with the riser.

The invention claimed is:

1. A vehicle for carrying at least one module along an elongate body to perform an operation on the elongate body, the vehicle comprising:
   an elongate support structure carrying the at least one module, wherein the at least one module includes at least one of a repair module configured to perform a repair operation on the elongate body, a maintenance module configured to perform a maintenance operation on the elongate body and an inspection module configured to perform an inspection operation on the elongate body, and wherein the vehicle is configured to hold the elongate support structure away from the elongate body; and
   a translation mechanism connected to the elongate support structure for causing the vehicle to translate along the elongate body, the translation mechanism comprising at least two translation members, each including a gripper and each being configured to be disengagable from the elongate body to pass a protuberance,
   wherein at least one of the grippers is a movable gripper that is movable relative to the support structure in the axial direction of the elongate body, and wherein the vehicle is configured to translate along the elongate body by moving the movable gripper whilst it is engaged with the elongate body, and
   wherein the at least one module is configured to perform an operation on the elongate body whilst carried by the elongate support structure.

2. The vehicle according to claim 1, wherein the at least one movable gripper is movable so as to move past at least one other gripper in the axial direction.

3. The vehicle according to claim 1, wherein the vehicle is configured to rotate around an axis of the elongate body.

4. The vehicle according to claim 1, wherein the at least one module comprises the repair module, the repair module including a housing shaped to surround the elongate body to establish a sealed chamber between the housing and the elongate body.

5. The vehicle according to claim 1, wherein the elongate body is a tubular body.

6. The vehicle according to claim 1, wherein the vehicle is configured to pass a protuberance on the elongate body.

7. The vehicle according to claim 1, wherein the elongate support structure does not surround more than 180° of the elongate body.

8. The vehicle according to claim 1, wherein the vehicle is configured to hold the elongate support structure such that its axis is substantially parallel to an axis of the elongate body.

9. The vehicle according to claim 1, wherein the translation mechanism is configured to hold the elongate support structure away from the elongate body.

10. The vehicle according to claim 1, wherein the translation mechanism is configured such that, when the vehicle translates, at least one translation member is engaged with the elongate body at all times.

11. The vehicle according to claim 1, wherein each translation member comprises a gripper system including:
    a mount connected to the support structure;
    an arm connected to the mount via a hinge; and
    the respective gripper.

12. The vehicle according to claim 1, wherein the vehicle comprises one or more guide assemblies for aligning the vehicle with respect to the elongate body, the one or more guide assemblies being separate from the translation mechanism.

13. The vehicle according to claim 12, wherein a guide assembly is configured to pass a protuberance on the elongate body.

14. The vehicle according to claim 1, wherein the vehicle is configured such that the at least one module can be removed and replaced by another, different module.

15. The method of performing an operation on an elongate body using a vehicle according to claim 1, the method comprising:
    performing at least one of a repair operation, a maintenance operation and an inspection operation on the elongate body using the at least one module carried by the elongate structure.

16. The method of performing an operation on an elongate body using a vehicle according to claim 4, the method comprising:
    translating along the elongate body to a repair site; and
    performing a repair operation on the elongate body at the repair site using the repair module carried by the elongate structure, wherein the repair operation comprises closing segments of the housing around the elongated body, thus forming a sealed chamber around the elongated body.

17. The method of performing operations on an elongate body using a vehicle according to claim 14, comprising:
    performing a first operation using a first module mounted to the vehicle;
    removing the first module from the vehicle and mounting a second module to the vehicle; and
    performing a second operation using the second module mounted to the vehicle.

18. The method according to claim 17, wherein the method is a method of inspecting and repairing the elongate body, wherein the first module is an inspection module and the first operation comprises performing an inspection process on the elongate body, and wherein the second module is a repair module and the second process comprises performing a repair on the elongate body using the repair module.

19. The method according to claim 18, further comprising:
    performing a cleaning operation using a cleaning module mounted to the vehicle; and
    removing the cleaning module from the vehicle and mounting the inspection module to the vehicle.

20. The vehicle according to claim 5, wherein the tubular body is a riser.

* * * * *